US008261111B2

(12) United States Patent
Ishidera et al.

(10) Patent No.: US 8,261,111 B2
(45) Date of Patent: *Sep. 4, 2012

(54) DEVICE HAVING A NORMAL WORKING STATE AND A STANDBY STATE AND COMPUTER READABLE STORAGE MEDIUM FOR CONTROLLING SAME

(75) Inventors: Nobutaka Ishidera, Inagi (JP); Takahiro Masuda, Kawasaki (JP); Yoshifusa Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

This patent is subject to a terminal disclaimer.

(21) Appl. No.: 12/149,955

(22) Filed: May 9, 2008

(65) Prior Publication Data
US 2008/0301554 A1 Dec. 4, 2008

Related U.S. Application Data

(63) Continuation of application No. 10/629,604, filed on Jul. 30, 2003, now Pat. No. 7,424,631.

(51) Int. Cl.
*G06F 1/32* (2006.01)
(52) U.S. Cl. ......................................... 713/320; 713/300
(58) Field of Classification Search ................... 713/320
See application file for complete search history.

(56) References Cited

U.S. PATENT DOCUMENTS

| 5,768,164 | A | | 6/1998 | Hollon, Jr. ................ 708/174 |
| 5,896,575 | A | * | 4/1999 | Higginbotham et al. ..... 455/566 |
| 6,073,187 | A | | 6/2000 | Jacobs et al. .................... 710/14 |
| 6,125,286 | A | | 9/2000 | Jahagirdar et al. ............ 455/566 |
| 6,137,676 | A | | 10/2000 | Merkel ......................... 361/680 |
| 6,215,474 | B1 | * | 4/2001 | Shah .............................. 345/168 |
| 6,259,932 | B1 | * | 7/2001 | Constien ..................... 455/556.1 |
| 6,415,138 | B2 | * | 7/2002 | Sirola et al. .................. 455/90.1 |
| 6,438,392 | B1 | * | 8/2002 | Toba ............................. 455/567 |
| 6,466,202 | B1 | | 10/2002 | Suso et al. .................... 345/169 |
| 6,487,396 | B1 | * | 11/2002 | Sassi ............................. 455/90.1 |
| 6,697,083 | B1 | * | 2/2004 | Yoon ............................. 345/658 |
| 6,748,243 | B1 | * | 6/2004 | Kubo et al. ................ 455/569.1 |

(Continued)

FOREIGN PATENT DOCUMENTS
JP 8-54949 2/1996
(Continued)

OTHER PUBLICATIONS

Japanese Office Action issued on Jan. 6, 2009 in corresponding Japanese Patent application 2006-214950.

(Continued)

*Primary Examiner* — Nitin Patel
(74) *Attorney, Agent, or Firm* — Staas & Halsey LLP

(57) ABSTRACT

There is provided a terminal automatically executing access processing to a URL registered in advance on a network in response to the cancellation operation of the power saving mode. This enables to execute accessing the predetermined URL on the network only by the cancellation operation of the power saving mode without need of an extra operation for the processing. Also, in a terminal having a folding mechanism, predetermined processing is automatically executed in response to the open motion from the closed condition. This enables to execute the predetermined processing only by the open motion without need of an extra operation for the processing. Thus operability of the terminal is improve, and as a result, convenience for the user is improved.

38 Claims, 40 Drawing Sheets

U.S. PATENT DOCUMENTS

| | | |
|---|---|---|
| 6,980,835 B2 | 12/2005 | Hama |
| 7,013,168 B2 * | 3/2006 | Nagasawa ............... 455/575.1 |
| 7,030,837 B1 | 4/2006 | Vong et al. .................. 345/1.3 |
| RE40,204 E * | 4/2008 | Yamamoto ............ 361/679.27 |
| 7,545,342 B2 * | 6/2009 | Vong et al. .................. 345/1.3 |
| 2002/0045467 A1 | 4/2002 | Hama |

FOREIGN PATENT DOCUMENTS

| | | |
|---|---|---|
| JP | 8-314586 | 11/1996 |
| JP | 8-328692 | 12/1996 |
| JP | 10-171564 | 6/1998 |
| JP | 11-298970 | 10/1999 |
| JP | 2000-253176 | 9/2000 |
| JP | 2000-284858 | 10/2000 |
| JP | 2000-339071 | 12/2000 |
| JP | 2001-186575 | 7/2001 |
| JP | 2001-337812 | 12/2001 |
| JP | 2002-199463 | 7/2002 |
| JP | 2002-297508 | 10/2002 |
| JP | 2033-44207 | 2/2003 |
| KR | 1999-0064909 | 8/1999 |

OTHER PUBLICATIONS

Korean Office Action, mailed Oct. 15, 2007, Issued in the corresponding Korean Application (1page).

European Search Report dated Oct. 7, 2010 and issued in corresponding European Patent Application 10170901.2.

European Search Report dated Oct. 8, 2010 and issued in corresponding European Patent Application 10170906.1.

European Search Report dated Oct. 7, 2010 and issued in corresponding European Patent Application 10170909.5.

European Search Report dated Oct. 7, 2010 and issued in corresponding European Patent Application 10170914.5.

European Search Report dated Oct. 8, 2010 and issued in corresponding European Patent Application 10170918.6.

* cited by examiner

FIG. 13
| IDENTIFICATION NUMBER | URL | DISPLAY CONTENTS (IDENTIFICATION INFORMATION) |
|---|---|---|
FIG. 14
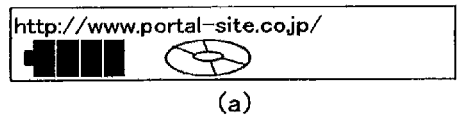
(a)
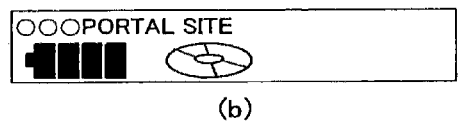
(b)
A TOUCH PANEL IS ATTAINED, FOR EXAMPLE,
BY COVERING THE FACE WITH A TOUCH-SENSITIVE SHEET.
(c)

(a)

(b)

(c)

(a)

BY CLICKING 'NEXT', DISPLAY IS CHANGED FROM
"http://www.fajitsa.com" TO "http://www.fmwarld.net"
(b) (THE PARTS WITH HALFTONE DOT MESHING).

(c)

(a)

(b) BY CLICKING 'NEXT', DISPLAY IS CHANGED FROM "http://ee.fajitsa.com" TO "http://dd.fajitsa.com" (THE PARTS WITH HALFTONE DOT MESHING).

SENDER: OGAWA<ogawa..
DATE: 2001/08/10
TITLE: IMPORTANT MESSAGE
TEXT:
 DEAR MR. SATO
 THANK YOU FOR KINDLY
COOPERATING IN ...

(b)

SENDER: ogawa@pc.com
DATE: 2001/08/10
TITLE: IMPORTANT MESSAGE
TEXT:
 DEAR MR. SATO
 THANK YOU FOR KINDLY
COOPERATING IN ...

DEVICE HAVING A NORMAL WORKING STATE AND A STANDBY STATE AND COMPUTER READABLE STORAGE MEDIUM FOR CONTROLLING SAME

CROSS-REFERENCE TO RELATED APPLICATIONS

This application is a Continuation application based on prior U.S. application Ser. No. 10/629,604, filed on Jul. 30, 2003, now U.S. Pat. No. 7,424,631, and hereby claims priority to International Application No. Japanese Application PCT/JP01/00994 filed Feb. 13, 2001, the contents of which are hereby incorporated herein by reference.

BACKGROUND OF THE INVENTION

1. Field of the Invention

The present invention relates to a terminal device which is connectable to a network and has a power saving mode, and more particularly a terminal device which automatically executes predetermined processing (such as accessing the network) in response to cancellation of the power saving mode. The present invention also relates to a terminal device having a folding mechanism which enables open and close motion of the terminal device, and more particularly a terminal device which automatically executes predetermined processing in response to an open motion of the terminal device from a closed condition thereof.

2. Description of the Related Art

In a terminal device (for example, a personal computer) which is connectable to a network for the purpose of using the Internet or the electronic mail, there is generally provided a power saving mode. This power saving mode is a function of reducing power consumption by suspending power supply to a predetermined device unit (display unit, memory, etc.) constituting computer equipment when there is no user operation continued for a certain period. When any operation (for example, operation by use of a mouse, a keyboard, etc.) is performed by the user after the terminal device enters the power saving mode, the power saving mode is cancelled and the terminal device is restored to a normal mode, that is, a mode before shifting to the power saving mode.

Accordingly, when the user wants to access a network such as the Internet using the terminal device which is already shifted to the power saving mode, it is necessary for the user to perform a certain operation for canceling the power saving mode once, and then activate a browser program or the like when any browser program or the like required for accessing the network has not been activated. Furthermore, it is necessary to input a desired URL (Uniform Resource Locator).

In such a way, various operations are required in order to make the terminal device access the desired URL through the network. This produces inconvenience to the user.

In addition, when using a terminal device such as a portable telephone having a folding mechanism by which the terminal device body can be opened and closed, it is necessary to perform an operation(s) for executing predetermined processing, once after performing an open motion from a closed condition. This also produces inconvenience to the user.

SUMMARY OF THE INVENTION

Accordingly, it is an object of the present invention to provide a terminal device enabling to access a predetermined URL on a network when restoring the operation mode from a power saving mode to a normal mode by a simpler operation than before.

Further, it is another object of the present invention to provide a terminal (device) which automatically executes desired processing when restoring from a power saving mode to a normal mode by a simpler operation than before.

Still further, in a terminal (device) having a folding mechanism by which the device can be opened and closed, it is an object of the present invention to provide a terminal device which automatically executes desired processing at the time that the terminal device concerned is shifted from a close condition to an open condition.

In order to attain the above-mentioned objects, the terminal device automatically performs access processing against a URL which is provided on a network and registered in advance, in response to a cancellation operation of the power saving mode. This enables to access a predetermined URL on the network only by the cancellation operation of the power saving mode, which brings about improved convenience to the user as well as improved operability of the terminal device.

Preferably, in accordance with the present invention to attain the aforementioned objects, a terminal device having a power saving mode in which the terminal device works with less power consumption than in a normal working mode is constituted of; a first display section in which display is turned off during the power saving mode, and the display is resumed when returning to the normal working mode; a storage section storing at least one URL on a network; a second display section which displays either the URL stored in the storage section or identification information corresponding to the URL at least during the power saving mode; and an access processing section which performs access processing against either the URL displayed on the second display section or the URL corresponding to the identification information, in response to a cancellation operation of the power saving mode. The access processing section is realized by, for example, a firmware which is incorporated in the second display section.

Preferably, depending on a URL type, the access processing section activates an application program necessary for accessing the URL, and the application program makes access to the URL. For example, when the URL type is a type designating a Web page address on the network, the access processing section activates a browser program. Also, when the URL type is a type designating an electronic mail address, the access processing section activates a mail program.

Preferably, the storage section stores either a URL which has been accessed last time before shifting to the power saving mode, or an arbitrary URL according to an instruction by a user. Further, the terminal device according to the present invention may further include a first operation section for selecting either the URL or the identification information corresponding to the URL displayed on the second display section from the plurality of URLs when the storage section stores a plurality of URLs.

Further, in the above-mentioned configuration of the terminal device according to the present invention, the first display section is mounted so as to be opened and closed against a main body of the terminal device, and the second display section is disposed in a visible position when the first display section is placed in a closed condition. Moreover, preferably, the terminal device according to the present invention may further include a second operation section for use in canceling the power saving mode, which is disposed in an operable position while the first display section is placed in the closed condition. Also, the terminal device may include a drive section enabling to open the first display section which is closed in the power saving mode, in response to the cancellation operation of the power saving mode.

Further, the terminal device in accordance with the present invention to attain the aforementioned objects is a terminal device having a normal working state and a standby state. The terminal device includes a display section which can display information in the standby state, and a processing section which performs processing corresponding to the information being displayed on the display section at the time of shifting from the standby state to the normal working state.

Still further, the aforementioned terminal device includes a main display section the display contents of which are placed in a visible condition in the normal working state, or in an invisible condition in the standby state, and a detection section which detects an operation for shifting the display contents of the main display section from the invisible condition to the visible condition. The display section is a subordinate display section the display contents of which are placed in the visible condition even when the main display section is placed in the invisible condition. The processing section performs processing corresponding to the information which has been displayed on the subordinate display section at the time the operation is detected.

For example, the normal working state is a normal working mode in which the main display section is placed in a display condition, and the standby state is a power saving mode in which the main display section is placed in a non-display condition and the device works with less power consumption than in the normal working mode, and the detection section detects a shift from the power saving mode to the normal working mode.

As an example, in a terminal (device) having a folding mechanism by which the terminal (device) can be opened and closed, the main display section is disposed in a position in which the display contents of the main display section are visible when the folding mechanism is placed in an open condition, while the display contents of the main display section are invisible when the folding mechanism is placed in a close condition. The display section is a subordinate display section disposed in a position in which the display contents of the subordinate display section are visible even when the folding mechanism is placed in the closed condition. The detection section detects an open motion of the folding mechanism from the closed condition.

In the embodiment of the present invention which will be described later, as a terminal device having a normal working state and a standby state, there is exemplified a personal computer having a normal mode (which corresponds to the normal working state) and a power saving mode (which corresponds to the standby state), as well as a-portable telephone having a folding mechanism by which the portable telephone can be opened and closed (in which an open condition corresponds to the normal working state, and a close condition corresponds to the standby state).

In the example of the personal computer in accordance with the embodiment described later, the visible condition in the normal working state represents a condition in which information is displayed on a main display section in the normal working mode, while the invisible condition in the standby state represents a condition in which information is not displayed on the main display section in the power saving mode.

Also, in the example of the portable telephone, the visible condition in the normal working state represents a condition in which the main display section can be viewed by placing the folding mechanism in an open condition, and the invisible condition in the standby state represents a condition in which the main display section cannot be viewed by placing the folding mechanism in a close condition.

It is to be noted that the normal working state and the standby state are neither limited to the normal mode and the power saving mode, nor to the open condition and the close condition described above. It may also be possible to apply any other two states than the above-mentioned modes or conditions.

BRIEF DESCRIPTION OF THE DRAWINGS

FIG. 13 shows an exemplary URL data configuration stored in a URL memory 124.

FIG. 14 shows a display example on a subordinate display section 120.

FIG. 36 shows a display example of a reception mail display screen on main display unit 21.

DETAILED DESCRIPTION OF THE PREFERRED EMBODIMENTS

The preferred embodiments of the present invention are described hereinafter referring to the charts and drawings. However, it is to be noted that the scope of the present invention is not limited to the embodiments described below.

According to an embodiment of the present invention, a terminal device executes access processing to a URL on a network, which is registered in advance, in response to a cancellation operation of a power saving mode. Hereinafter, the embodiment of the present invention will be illustrated by exemplifying a notebook personal computer as a terminal device, which is provided with a main display section and a subordinate display section. Here, the main display section is a display section of comparatively large screen size (such as a liquid crystal display unit and a CRT display unit), on which display screen contents generated (or obtained) by a browsing program or other application programs are displayed. Display on the main display section is turned off during the power saving mode, and the display is resumed to turn on when returning to the normal mode. In contrast, the subordinate display section is a display section of comparatively small display size on which a remaining battery capacity, access conditions to various devices, etc. are displayed. Most of the subordinate display sections mounted on notebook personal computers are formed of liquid crystal display units.

Figure 1:
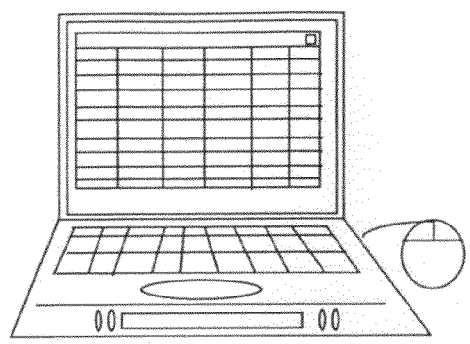
FIGS. 1, 2, 3, 4, 5 and 6 show diagrams illustrating an outline of the network access processing in accordance with an embodiment of the present invention.

FIGS. 1 through 6 show diagrams illustrating an outline of network access processing in accordance with the embodiment of the present invention. In FIG. 1, there is activated an application program (such as a spreadsheet program) other than an application program for network access (browser). Inside the notebook personal computer, a variety of devices such as a CPU, a memory and a hard disk drive (which are not shown) are housed. Also, a keyboard is disposed on a main body of the notebook personal computer. The main display section is attached on a main body of the personal computer in such a way that the main display section can be opened or closed against the main body. While the main display section is closed against the main body, a user of the notebook personal computer is neither able to look at a screen of the main display section, nor to operate the keyboard. In addition, an external input device such as a mouse may be connected onto the main body of the notebook personal computer.

Figure 2:
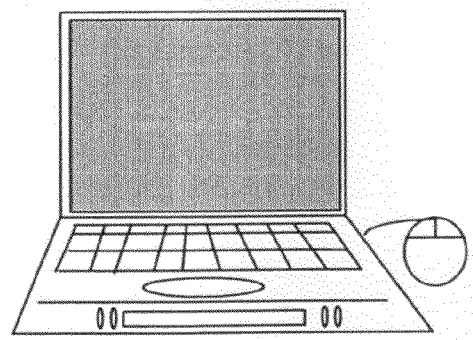
Figure 3:

During a condition of a predetermined application program being activated, when the notebook personal computer is shifted to the power saving mode, a display screen of the main display section is turned off, as depicted in FIG. 2. In addition, at this time, the main display section may also be closed, as shown in FIG. 3.

Figure 4:
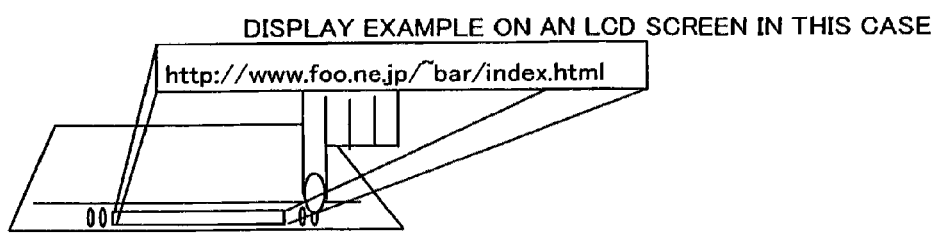
Figure 5:
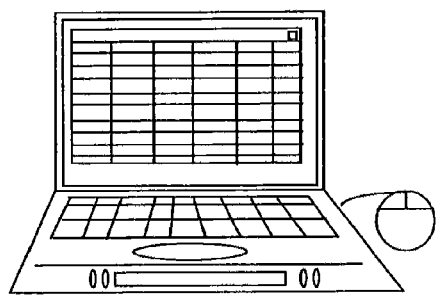

Even in the power saving mode, display on the subordinate display section of the notebook personal computer is not turned off, and a predetermined URL is displayed thereupon, as shown in FIG. 4. Here, it is also possible to configure such that a URL to be displayed on the subordinate display section is altered when a predetermined operation is performed. Thereafter, the power saving mode is canceled. The cancellation of the power saving mode is enabled, for example, by depressing a predetermined switch which is operable even when the main display section is closed, or depressing a key on the keyboard when the main display section is open, or operating the mouse. Here, as shown in FIG. 5, when the main display section is closed, the main display section is opened again. It may also be possible to configure such that the power saving mode is canceled in response to an open motion of the main display section. In such a configuration, there is provided a switch which responds to the open/close motion of the main display section, and thereby the open/close motion of the main display section can be detected when the switch is turned on and off.

Figure 6:
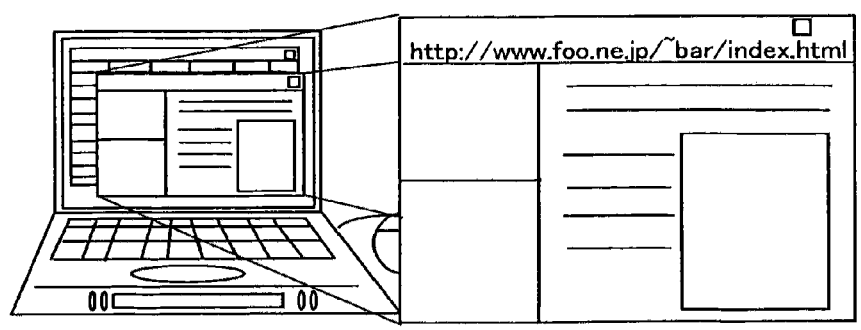

According to the embodiment of the present-invention, in response to the cancellation of the power saving mode, a program for accessing the URL designated in the subordinate display section is automatically activated, as shown in FIG. 6. For example, when the URL indicates an electronic mail address, an electronic mail transmission/reception program is automatically activated, or when the URL indicates a Web (World Wide Web) address in the Internet, a browser program is automatically activated. Such a program then accesses the designated URL, and a screen corresponding to the designated URL is displayed on the main display section.

In such away, according to the embodiment of the present invention, the terminal device automatically accesses the URL displayed on the subordinate display section, on restoration from the power saving mode to the normal mode. Thus, it becomes possible to simplify operations performed by the user. The embodiment of the present invention will be illustrated more specifically in the following description.

Figure 7:
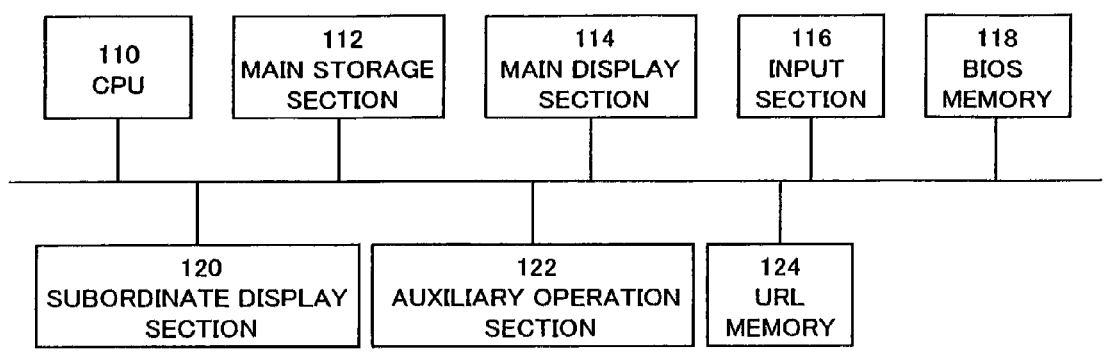
FIG. 7 shows an exemplary block configuration of a terminal device in accordance with the embodiment of the present invention.

FIG. 7 shows a diagram illustrating an exemplary block configuration in accordance with the embodiment of the present invention. In FIG. 7, the terminal device provides a CPU 110 which executes the OS (operating system) and a variety of application programs stored in a main storage section (hard disk drive, or HDD) 112. A main display section (liquid crystal display unit) 114 displays information corresponding to an application program which is executed based on a normal operation by a user. Further, an input section 116 is constituted of a keyboard, a mouse, etc. When there has been no predetermined operation against input section 116 for a certain period, CPU 110 is shifted from the normal mode to the power saving mode.

A BIOS (Basic Input Output System) memory 118 is a memory storing the BIOS. Setting information related to the power saving mode, such as a designation to enable or disable the power saving mode, a time until starting the transition to the power saving mode, is stored in this BIOS memory.

As mentioned earlier, a subordinate display section 120 is a display section of comparatively small size, which displays information of a remaining battery capacity in the terminal device, conditions of accessing a variety of devices, and the like. According to the embodiment of the present invention, there is displayed on subordinate display section 120 a URL to be automatically accessed at the time of restoring from the power saving mode to the normal mode. Further, in subordinate display section 120, there are incorporated a program(s) (firmware) which enables processing function(s) required for the embodiment of the present invention, and a processor which executes such a program.

Further, an auxiliary operation section 122 is provided with, for example, a selection key, an execution key, etc. The selection key is a key for selecting one of a plurality of items which can be displayed on subordinate display section 120, as well as displaying the selected item. The selection key is exemplarily constituted of a jog dial. The jog dial has a wheel, and a display item can be altered by rotating the wheel. Also, by depressing the wheel, the display content being displayed at the moment can be selected. Such a selection key is not only limited to a single jog dial. For example, the selection key may also be constituted of a plurality of buttons, such as buttons for proceeding to the next item, returning to the previous item, fixing on the current item, scrolling right, and scrolling left. Further, subordinate display section 120 may also include a touch panel function. An operation identical to a selection key operation may be effected when the user touches an area displayed as a selection key area on subordinate display section 120.

When there is a single display item only to be displayed, the selection key is no need to operate, needless to say. Next, the execution key is a key for terminating the power saving mode, activating a predetermined application program, and accessing the URL displayed on subordinate display section 120. The execution key is disposed in such a position as is operable even when the main display section is in the closed condition. This enables to execute the processing in the embodiment of the present invention, even when the keyboard is not operable because the main display section is closed, or the mouse is not connected. Needless to say, it may also be possible to cancel the power saving mode by operating the keyboard or the mouse. In addition, it may also be possible to provide the selection key and the execution key independently, or otherwise, adopt other operation means (for example, a jog dial) to be commonly used for the functions of the selection key and the execution key.

Moreover, a URL memory 124 is a storage means, in which a URL to be displayed on subordinate display section 120 is stored. In this memory, there are stored a history of the URLs accessed in the past, and a URL either selected or input by a predetermined means. As URL memory 124, a portion of an area in the hard disk drive (HDD) may be allocated, or a nonvolatile memory may be mounted separately.

The terminal device in accordance with the present invention has the following functions: (1) Importing the BIOS setting at the time of the system activation, (2) shifting to the power saving mode, (3) accessing a URL at the time of canceling the power saving mode, and (4) selecting and displaying a URL at the time of the normal mode and the power saving mode. Each function will be illustrated further in the following description.

Figure 8:
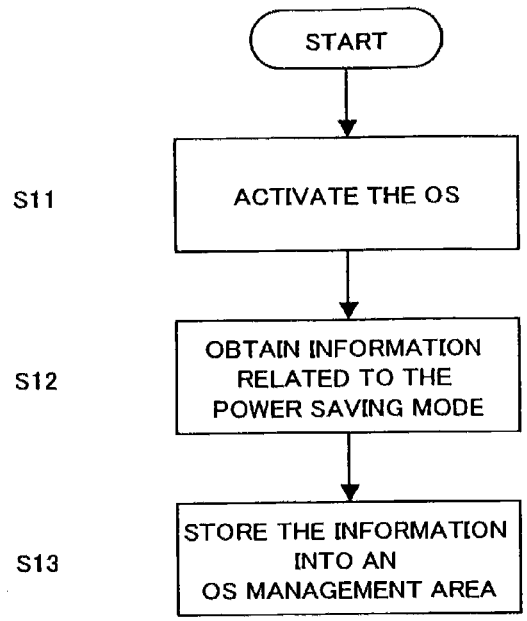
FIG. 8 shows a flowchart of a BIOS setting import processing at the time of system activation.

FIG. 8 shows a flowchart illustrating the BIOS setting importing processing performed at the time of the system activation. This processing is carried out under the OS. In FIG. 8, the OS is activated when the power is switched on (step S11). The OS reads out from BIOS memory 118 information related to the power saving mode, which includes a power saving mode enable flag, and time information indicating a time until shifting to the power saving mode (S12). This information is then stored into a storage area (in HDD, main memory, or the like) managed by the OS, which is referred to as an OS management area (S13). In such a way, the OS obtains the information related to the power saving mode in advance, and stores the information into the OS management area, thus it becomes possible for the OS to perform transition processing to the power saving mode.

Figure 9:
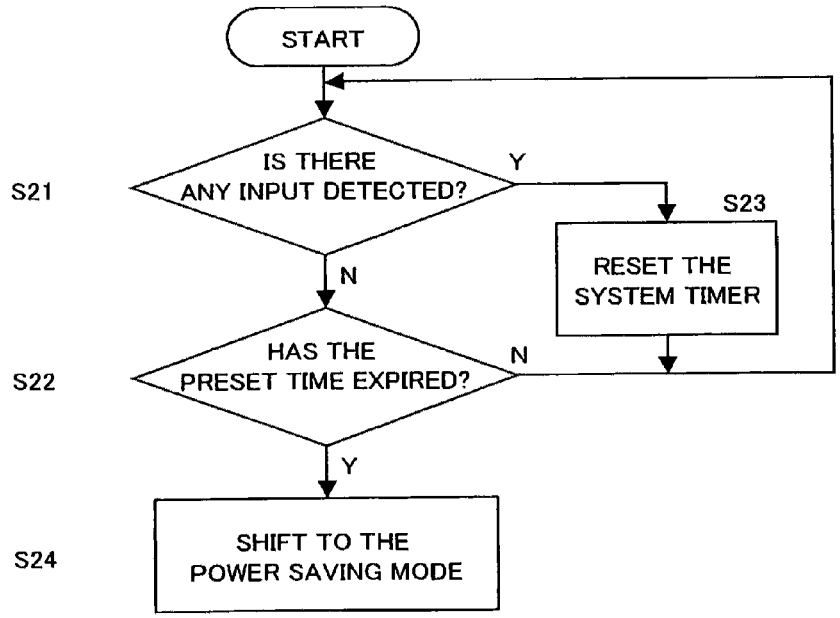
FIG. 9 shows a flowchart of processing for shifting to a power saving mode and for canceling the power saving mode.

FIG. 9 shows a flowchart illustrating the transition processing to the power saving mode. This processing is also executed under the OS. First, the OS monitors whether or not there is any input received from the input section such as the keyboard or the mouse (S21), and measures an interval between the inputs by use of a system timer provided in the terminal device. When there is an input before the time preset in the timer expires (S22), the OS resets the system timer (S23) and starts the time measurement afresh. When the preset time has elapsed without any input (S22), the terminal device is shifted to the power saving mode (S24). More specifically, a power supply control against each device in the terminal device is shifted to the BIOS, and the BIOS suspends to supply the power to the predetermined units (such as HDD and CPU) in the terminal device.

Figure 10:
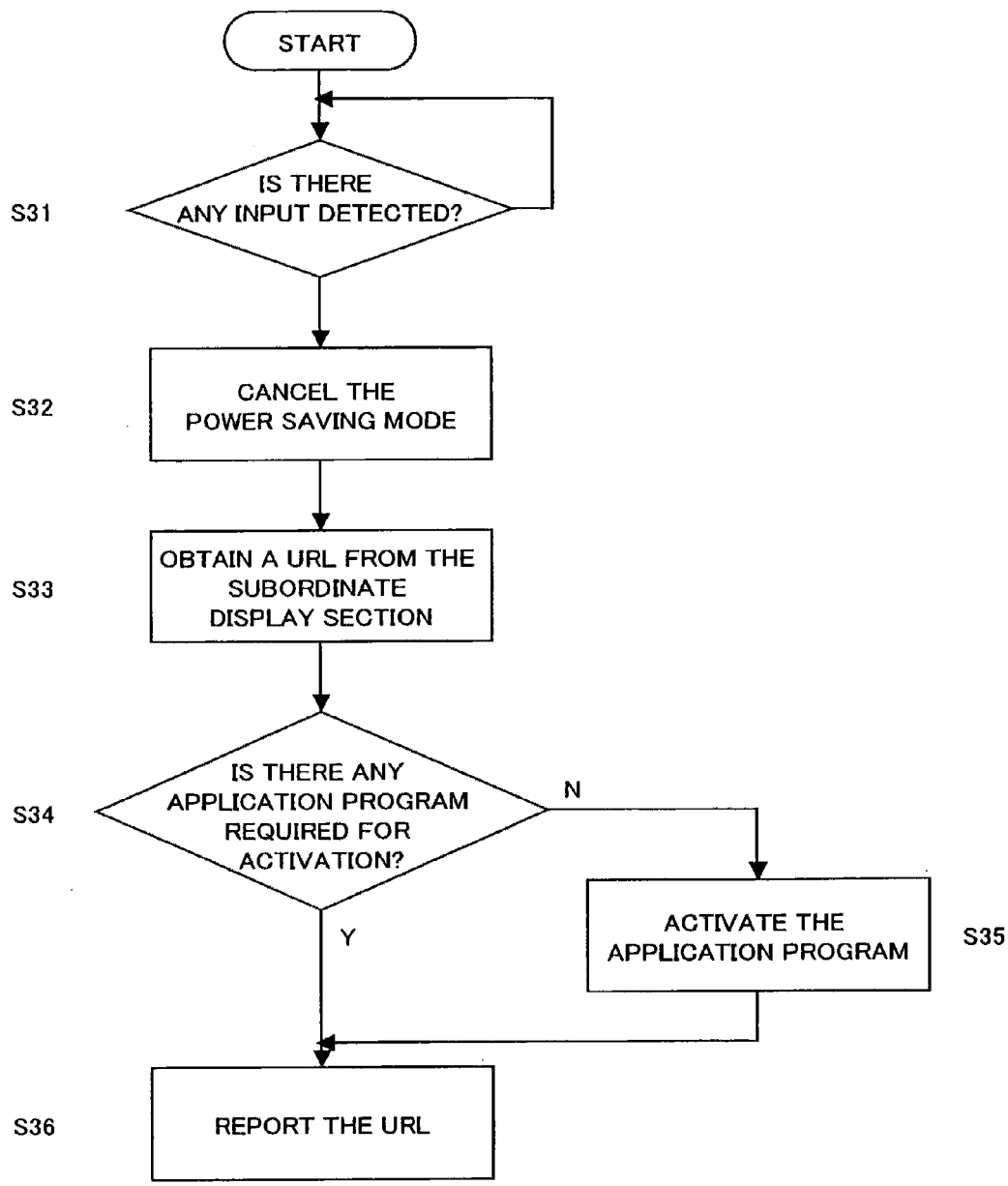
FIG. 10 shows a flowchart of a first accessing processing to a URL at the time of power saving mode cancellation.

FIG. 10 shows a flowchart of a first access processing to a URL at the time of canceling the power saving mode. This processing is executed by the firmware provided in subordinate display section 120. In the power saving mode, the firmware of subordinate display section 120 monitors whether or not there is any input received from either input section 116, such as the keyboard or the mouse, or auxiliary operation section 122 (S31). When an input is detected, the firmware notifies the BIOS of this detection. This produces the power supply control to shift from the BIOS to the OS, and the OS resumes the power supply to the units to which the power supply has been suspended. Thus, the power saving mode is canceled (S32). Thereafter, the OS obtains the URL displayed on the subordinate display section 120 (S33), and checks whether or not an application program necessary for accessing the URL has already been activated (S34). When such an application program has not been activated yet, the OS activates the application program (S35), and reports the URL to the application program concerned (S36). Consequently, the terminal device is resumed to the normal mode, and the application program having been activated in the normal mode starts accessing to the URL which was received.

In the above process, the firmware provided in subordinate display section 120 selects an application program to be activated in accordance with a format of the URL. For example, if the URL has a format of 'http:// . . . ', this URL denotes a Web page address, and accordingly, a browser application program is selected. If the URL has a format of 'mailto: . . . ', this URL denotes an electronic mail address, and accordingly, an application program for the electronic mail is selected. Or, if the URL has a format of 'ftp:// . . . ', an application program for the file transfer protocol (FTP) is selected. Here, when the browser application program was selected corresponding to the URL format, the browser application program is instructed to obtain and display a Web page denoted by the URL concerned. When the electronic mail application program was selected corresponding to the URL format, the electronic mail application program is instructed to generate an electronic mail, which is addressed to a mail address denoted by the URL concerned. Also, when the FTP application program was selected corresponding to the URL format, the FTP application program is instructed to download a file denoted by the URL concerned. In addition, generally, a URL having the 'http:// . . . ' format is the URL by which a browser application program is to be selected. However, depending on a file to be accessed by the URL concerned, there may be required other application programs oriented for each purpose, such as playing MIDI data, regenerating other voice data, and regenerating moving images. In such cases, it is possible to employ application programs prepared for respective purposes. Information on which application program is required is obtained from the settings of the browser application program.

The transition processing to the power saving mode or the cancellation processing therefrom is not limited to the processing shown in FIGS. 8 and 9.

For example, it may be possible to provide a switch which detects an open condition or a close condition of the display unit (main display section 114), and configure the terminal device so as to shift to the power saving mode when the above-mentioned switch detects a close motion of the display unit shifted from the open condition. It is also possible to configure the terminal device in such a way that the power saving mode is canceled when the above-mentioned switch detects an open motion of the display unit shifted from the closed condition.

According to the above-mentioned configuration in which the open operation of the display unit initiates the cancellation of the power saving mode, the information which the user desires can be displayed on subordinate display section 120 when the display unit is placed in the closed condition, and with a simple operation of opening the display unit, it becomes possible to execute processing related to the information displayed on subordinate display section 120 (i.e. processing of displaying information on main display section 114). Thus, it becomes possible to attain more convenience to the user.

Figure 26:
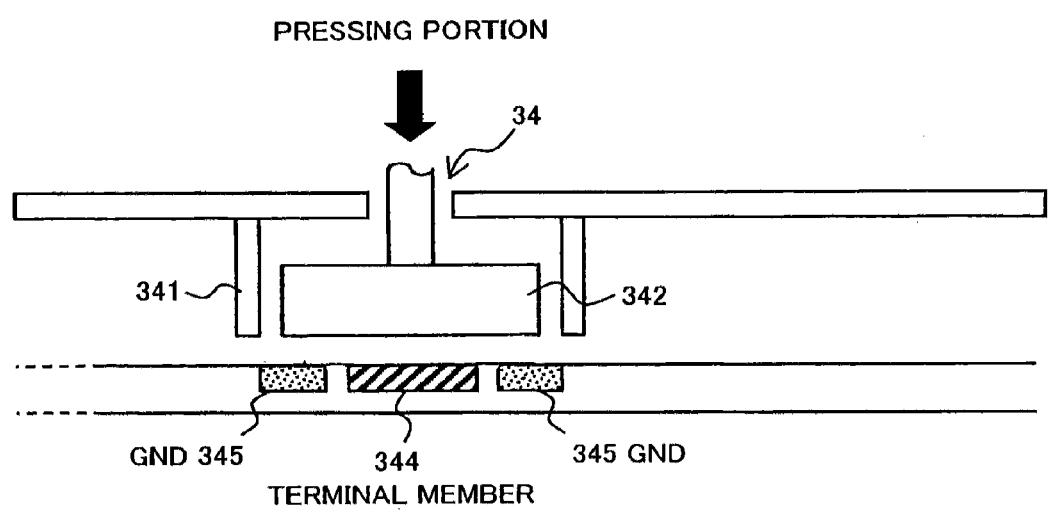
FIG. 26 shows a diagram illustrating a detection mechanism detecting an open/close condition of a portable telephone 20.

Here, similar structure to that shown in FIG. 26 illustrated later may be used as a switch for detecting the open condition and the close condition of the display unit.

Also, it may be possible to configure such that the main display section is automatically opened when the power saving mode is canceled while the main display section is placed in the closed condition. For this purpose, the terminal device may incorporate a drive means such as a motor so as to open the main display section automatically. In response to the cancellation of the power saving mode, the firmware in subordinate display section 120 opens the main display section to an appropriate preset angle against the main body by driving the motor, when the main display section is placed in a closed condition.

Figure 11:
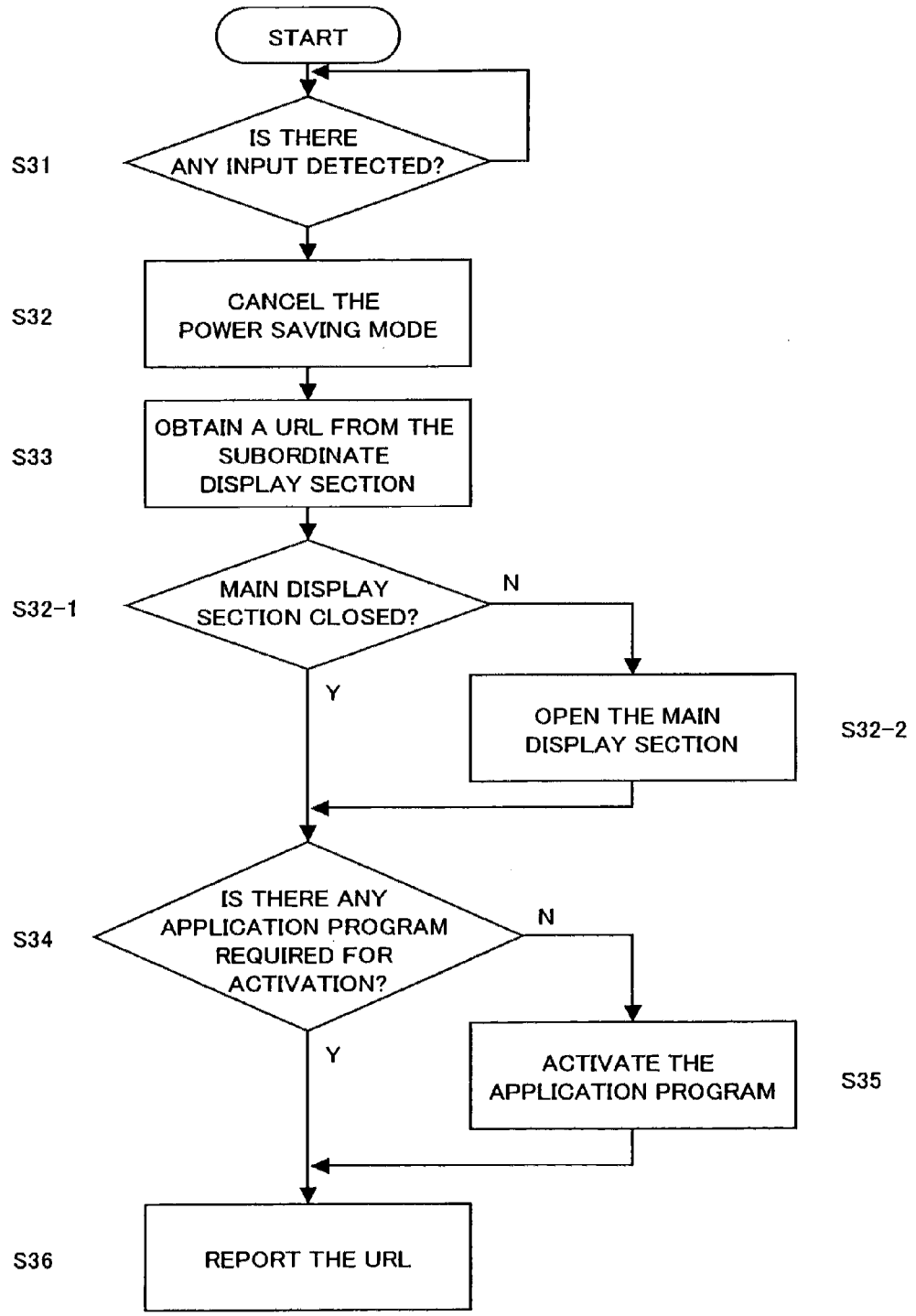
FIG. 11 shows a flowchart of a second accessing processing to a URL at the time of power saving mode cancellation.

FIG. 11 shows a flowchart of a second access processing to a URL at the time of canceling the power saving mode, in which identical reference numbers are respectively assigned to the processes which are identical to those shown in FIG. 10. In FIG. 11, the firmware in subordinate display section 120 monitors whether or not there is any input from either input section 116 or auxiliary operation section 24 (S31). When an input is detected, the power saving mode is canceled (S32).

Thereafter, it is checked whether or not the main display section is closed (S32-1). When the main display section is closed, the body is opened to a predetermined angle by driving the drive means (S32-2). The information related to the URL displayed on subordinate display section 120 is obtained (S33), and it is checked whether an application program necessary for accessing the URL of interest has already been activated (S34). When the application program is not activated yet, the program of interest is activated (S35), and the URL is informed to the application program of interest (S36). Thus, the terminal device is restored to the normal mode, and the application program being activated in the normal mode starts to access the received URL.

Depending on the URL accessed, a voice data file (for example, a file having the MP3 format may possibly be designated. In such a case, only an application program for voice data regeneration may be activated so as to regenerate the voice data file concerned, neither opening the main display section nor activating the browser application program. Accordingly, the main display section is not opened when any file unnecessary for opening the main display section is specified. Thus, convenience to the user can be attained.

Figure 12:
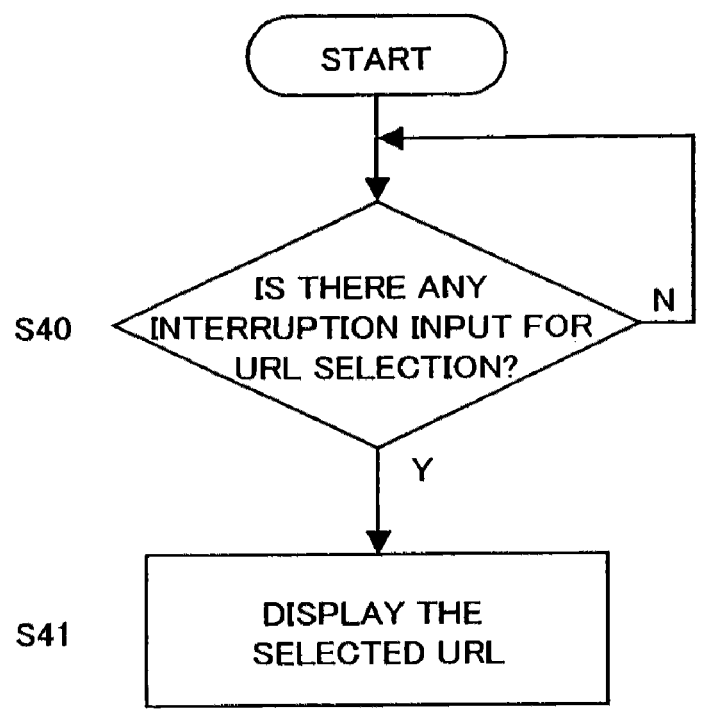
FIG. 12 shows a flowchart illustrating URL selection and display processing.

FIG. 12 shows a flowchart of URL selection and display processing. This processing is performed by the firmware in subordinate display section 120. In addition, this processing is performed irrespective of under the normal mode or the power saving mode. The firmware in subordinate display section 120 monitors whether or not an interruption input for URL selection exists (S40). More specifically, the firmware monitors whether or not an operation of the selection key (jog dial) in auxiliary operation section 122 is performed. On detection of the operation of the jog dial, URLs stored adjacent (previous or next) to the currently displayed URL among a plurality of URLs, which are reserved in order in URL memory 124, are successively selected and displayed (S41). The selection of either forward or backward direction is determined by the rotation direction of the jog dial.

Now, exemplary methods of storing a URL into URL memory 124 are described in the following. In order to store a URL into URL memory 124, the following methods may be considered: (1) The firmware provided in subordinate display section 120 monitors URL which are output from application programs such as a browser (which is exemplified in the following description), obtains the output URL, and stores the URL into URL memory 124. (2) A URL storing menu is provided in the browser, and based on a menu selection operation by the user, the browser stores at least one URL either input or selected on the browser into URL memory 124. (3)

By means of an add-in function provided in the browser, the browser automatically stores at least one URL determined on the browser into URL memory 124. (4) Another menu storing URLs is provided in the browser, and based on a menu selection operation, at least one URL described in the currently displayed Web page is collectively stored into URL memory 124.

In case of above-mentioned (1), URL memory 124 stores at least the URL having been accessed last time before the transition to the power saving mode. Further, it may also be possible to display the URL of interest on subordinate display section 120 at the initial setting. If URL memory 124 stores a predetermined number of URLs having been accessed in the past, it may also be possible to set in the initial setting so as to display the last URL having been accessed before the transition to the power saving mode. By use of the aforementioned selection key, any of other URLs may be selected. Further, in case of (4), the browser analyzes the Web page and extracts a URL described in the Web page.

FIG. 13 shows an exemplary configuration of a URL data stored in URL memory 124. The URL data is constituted of an identification number (sequence number), a URL and display contents (identification information) corresponding thereto.

FIG. 14 shows a display example on subordinate display section 120. In FIG. 14(*a*), an Internet Web page address (URL) is displayed in addition to the battery charge condition and the mounted condition of an optical disk such as a CD-ROM. Or, it may also be possible to display a title (the above-mentioned identification information) attached to the URL in place of the URL itself, as shown in FIG. 14(*b*). When a title is assigned in advance on the Web page data (HTML file) corresponding to the URL, this title may be used, or otherwise, an arbitrary title may be set by the user. Moreover, as shown in FIG. 14(*c*), it may also be possible to provide a touch panel function in subordinate display section 120, on which auxiliary operation section 122 (including an execution button and a selection button) is displayed.

Figure 15:
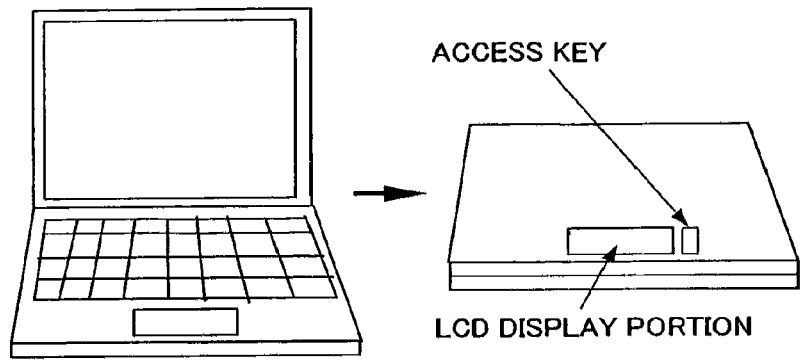
FIG. 15 shows an exemplary mounting structure of subordinate display section 120, etc.
Figure 15:
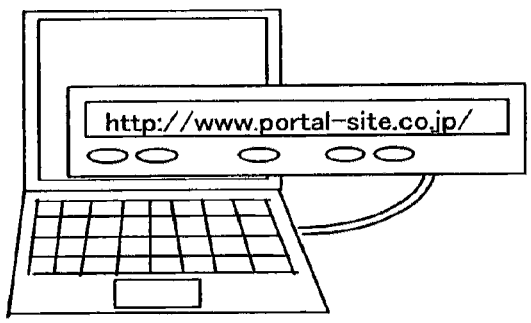
Figure 15:
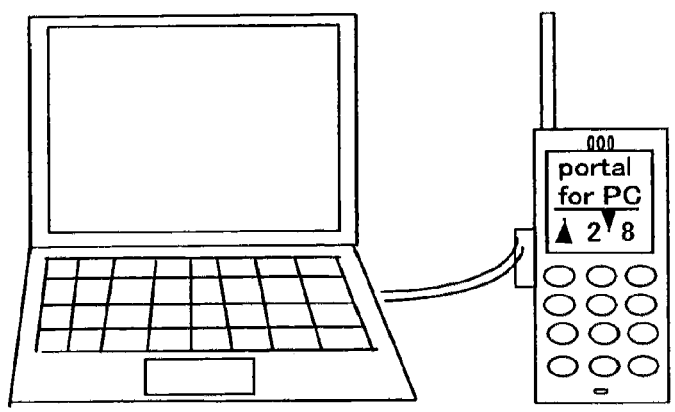

FIG. 15 is a diagram illustrating an exemplary mounting structure of subordinate display section 120 and the like. As shown in FIG. 15(*a*), preferably, subordinate display section 120 is mounted in such a position as can be viewed by the user even when the main display section is placed in the closed condition. This is because the main display section is possibly closed in the power saving mode. Further, preferably, auxiliary operation section 122 is also mounted in such a position as is operable by the user even when the main display section is closed. Or, as shown in FIG. 15(*b*), it may also be possible to dispose subordinate display section 120, auxiliary operation section 122 and URL memory 124 separately as independent units. In this case, the aforementioned processing and operation is achieved by connecting these external independent units to the notebook personal computer. Moreover, as shown in FIG. 15(*c*), the functions of subordinate display section 120 and auxiliary operation section 122 may also be attained by use of a portable telephone. By use of a communication program conforming to a predetermined communication standard, it is possible to utilize a screen of the portable telephone functioning as subordinate display section 120, as well as dial buttons of the portable telephone functioning as auxiliary operation section 122. Further, a storing medium incorporated in the portable telephone is used as URL memory 124.

[Other Embodiments]

Figure 16:
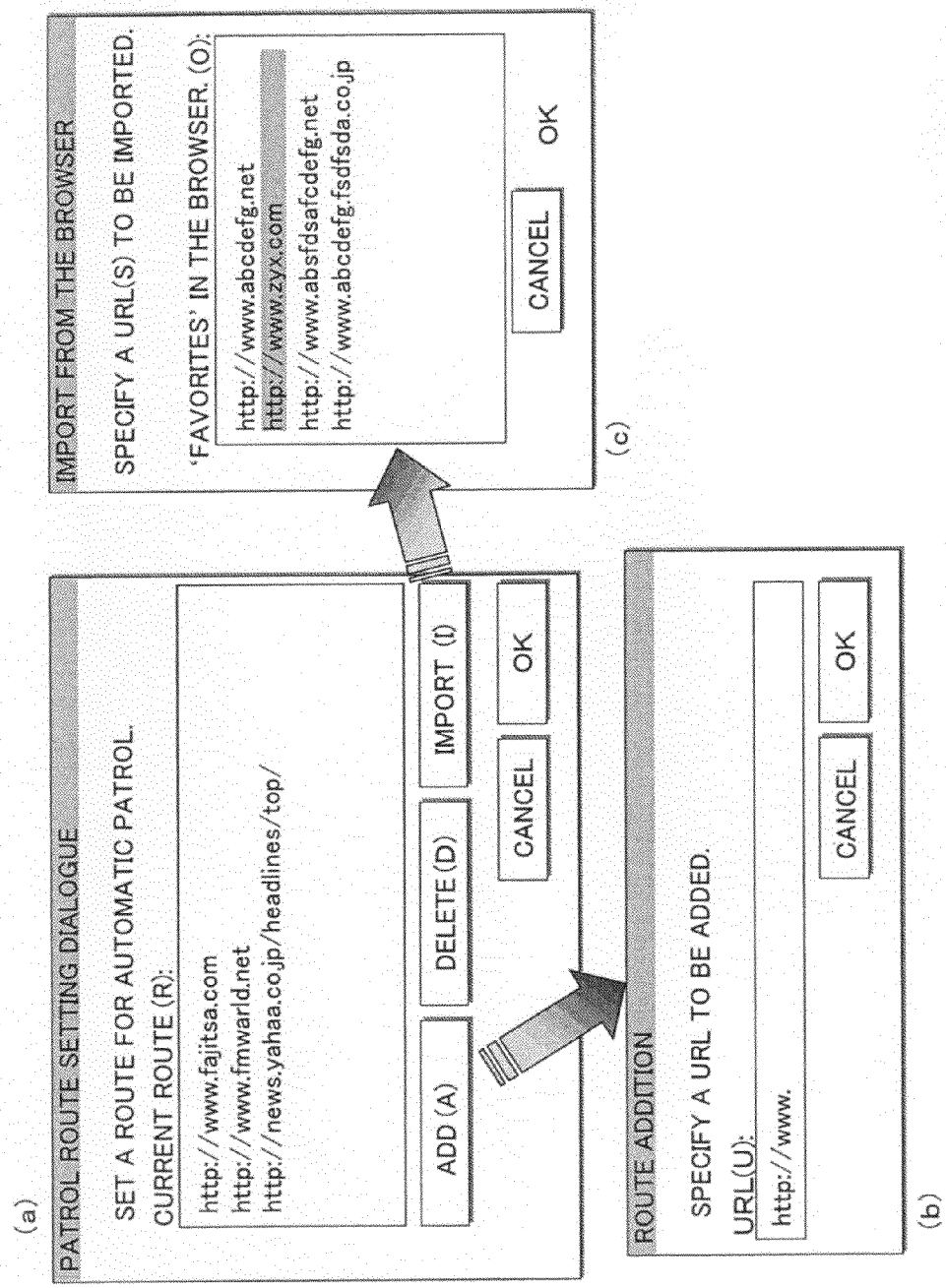
FIG. 16 shows a diagram illustrating the setting of a patrol route by an automatic patrol program.

Hereafter, other embodiments of the present invention will be illustrated. In accordance with an additional embodiment, a function of automatically patrolling Web pages detects an updated Web page, and stored this detected Web page into URL memory 124. A URL of the updated Web page having been detected is displayed on subordinate display section 120. In response to a cancellation operation of the power saving mode, an application program corresponding to this URL (in this case, a browser program) is activated and the processing which makes access to the URL concerned is performed FIG. 16 shows a diagram illustrating the setting of a patrol route by an automatic patrol program. In the normal mode, the user sets the patrol route against the patrol program. The patrol route is set either by an external input from the user, or by an import input of the URL having been registered in advance in the 'Favorites' of the browser program. FIG. 16(*a*) shows an exemplary screen for setting the automatic patrol route. FIG. 16(*b*) shows an exemplary screen for inputting URLs from the user by the use of the input means such as the keyboard. Also, FIG. 16(*c*) shows an exemplary screen for importing URLs from the 'Favorites' of the browser.

Figure 17:
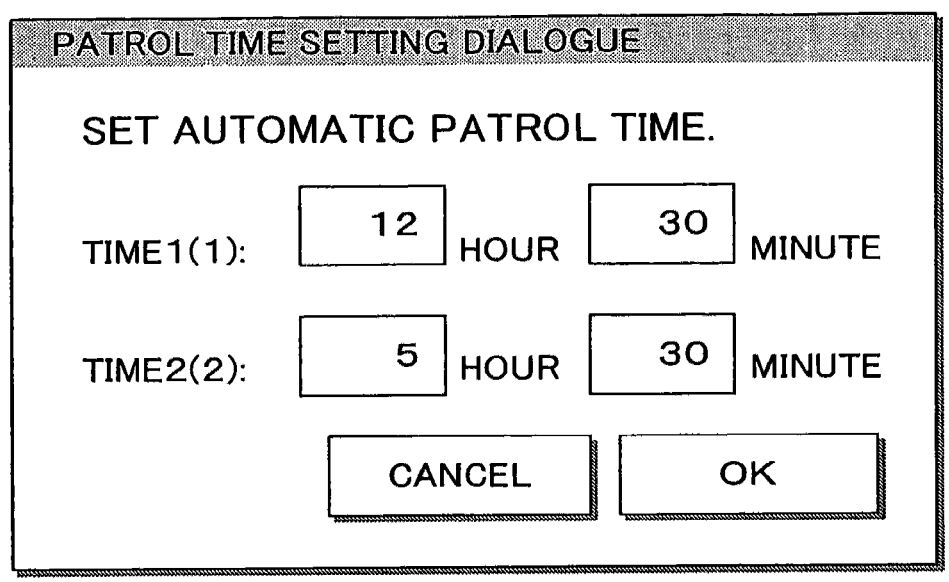
FIG. 17 shows a diagram illustrating the setting of patrol time by the automatic patrol program.

FIG. 17 shows a diagram illustrating the setting of patrol times set by the automatic patrol program. In the normal mode, the user sets patrol time against the automatic patrol program. In FIG. 17, an exemplary screen for setting the patrol times, in which, for example, two times (namely, twice per day) can be set.

Figure 18:
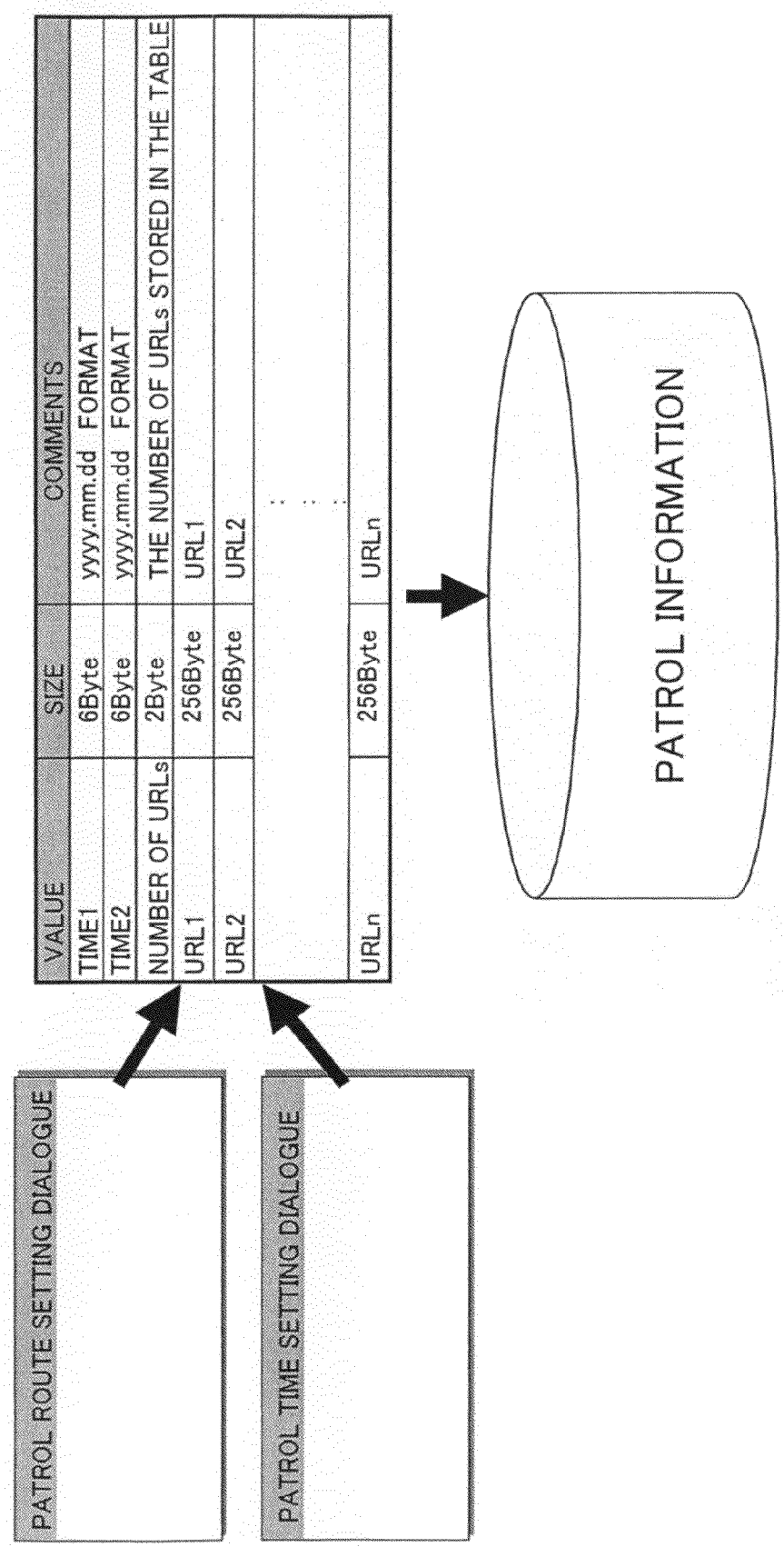
FIG. 18 shows a diagram illustrating an example of patrol information.

FIG. 18 shows a diagram illustrating an example of the patrol information. The automatic patrol program reserves the patrol information having been set in the aforementioned manner into the storage unit (such as the hard disk drive) of the terminal device. The patrol information includes patrol times and at least one URL constituting the patrol route, as shown in the figure.

Figure 19:
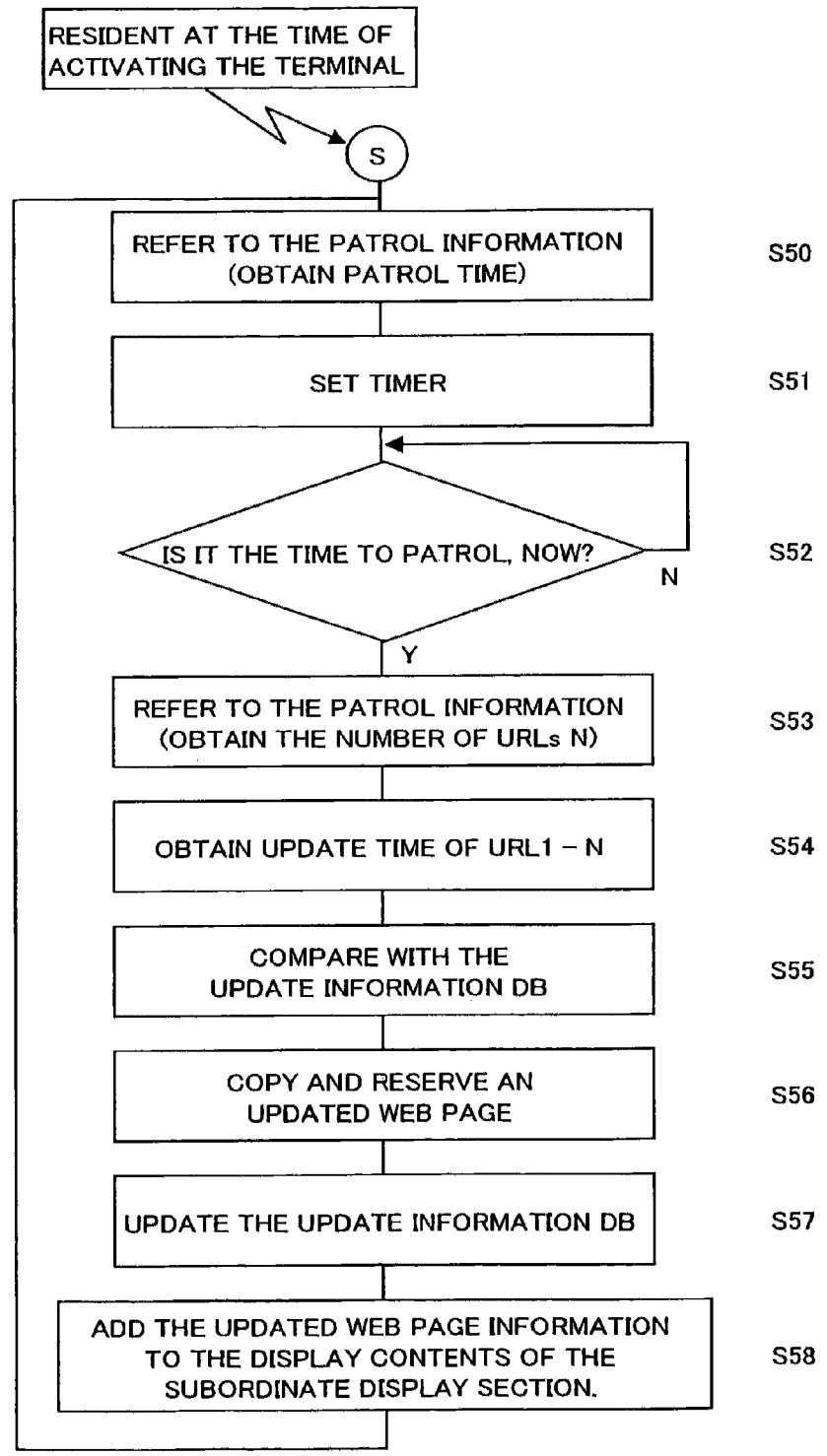
FIG. 19 shows a processing flowchart of the automatic patrol program.

FIG. 19 shows a processing flowchart of the automatic patrol program. On activation of the OS, the automatic patrol program is automatically activated. First, the automatic patrol program refers to the patrol information and obtains the patrol time (S50), and sets a timer up to the patrol time based on the current time (S51). When the time reaches the patrol time having been set in the timer (S52), the automatic patrol program obtains URLs to be patrolled by referring to the patrol information (S53). The automatic patrol program then activates the browser program, accesses each URL having been obtained, and thus obtains an update time (updated, or generated, date and time) of each Web page corresponding to the URL (S54). The update time is contained as one of the header information set of an HTML file constituting the Web page. When the update time of the Web page is obtained for each URL, the automatic patrol program compares the time with an update time of each Web page having been registered in update history information (S55).

Here, the determination of whether the Web page is updated is not limited to the above-mentioned processing.

For example, as described later, it may also be possible to check whether the Web page is updated by comparing the contents of the Web page having been reserved before with the contents of the Web page obtained this time. When these contents are different, it is determined the update has been performed. In this case, the date/time of having obtained the Web page may be regarded as the updated date/time of the Web page.

Figure 20:
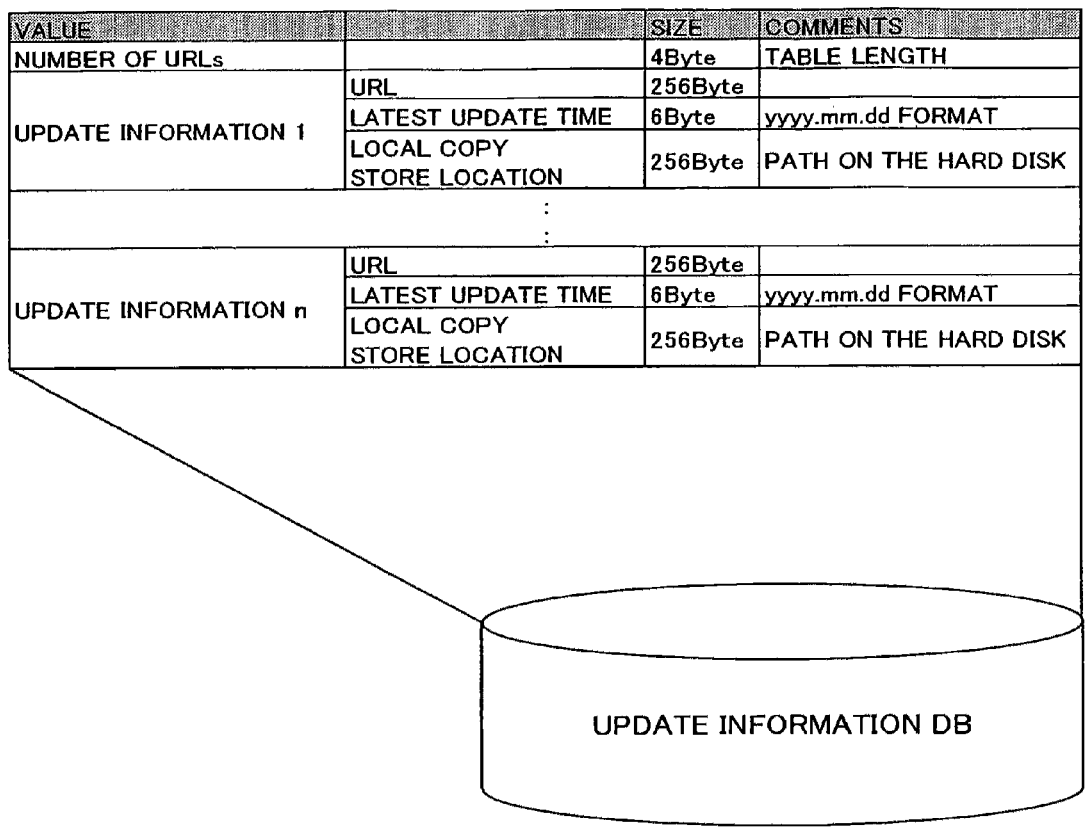
FIG. 20 shows a diagram illustrating update history information.

FIG. 20 is a diagram illustrating the update history information. This update history information is a database in which the latest update time is registered on a URL-by-URL basis. The update history information is generated by the automatic patrol program and reserved in the storage unit (such as the hard disk drive) of the terminal device. The update history information also includes store location information in the storage unit in which a duplicated Web page is reserved, as described later.

Referring back to FIG. 19, when comparing-the update times, if the update time obtained from the accessed Web page is newer than the update time of the Web page concerned having been registered in the update history information, the automatic patrol program duplicates the Web page concerned and reserves this duplicated Web page into a store location designated in the update history information (S56). Also, the automatic patrol program updates the update time in the update history information (S57).

Further, the automatic patrol program adds into URL memory 124 the URL of the updated Web page, corresponding display contents (identification information such as a Web page title), etc., so as to display on subordinate display section 120 (S58).

Figure 21:
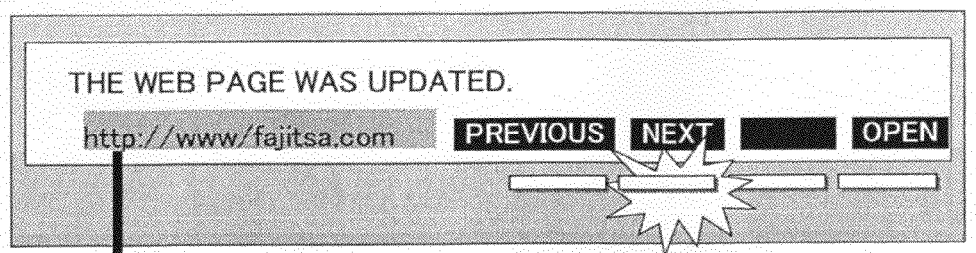
FIG. 21 shows a diagram illustrating an exemplary display of a URL for an updated Web page on subordinate display section 120.
Figure 21:
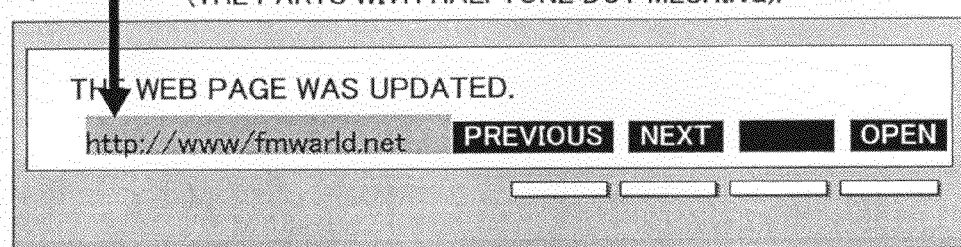
Figure 21:
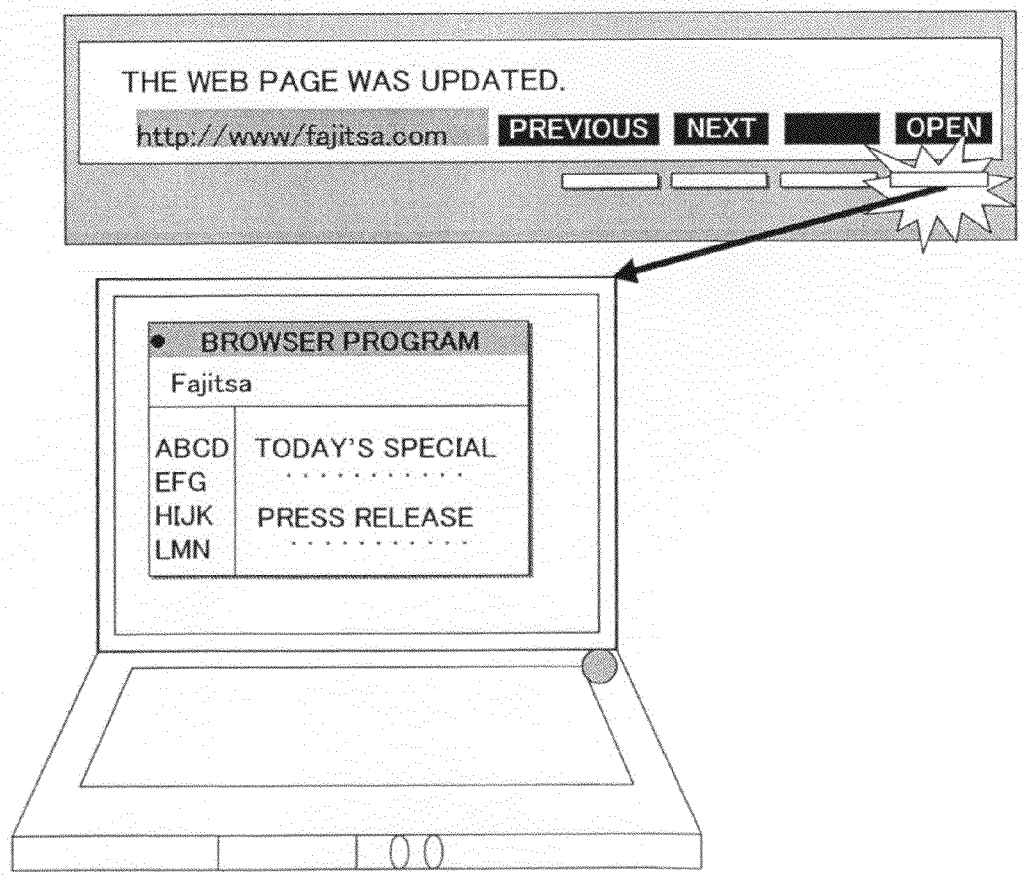

FIG. 21 shows a diagram illustrating a display example of the URL of the updated Web page on subordinate display section 120. In FIG. 21, there is shown a case of detecting the update of Web pages corresponding to two URLs having, for example, http://www.fajitas.com and http://www.fmwarld-.net. In FIG. 21(a), the former URL is displayed. Also, in FIG. 21(b), the latter URL is displayed. By use of scroll buttons ('Previous' and 'Next') designated on subordinate display section 120, these displays can be altered.

As shown in FIG. 21, the terminal device is provided with operation buttons related to the information displayed on subordinate display section 120, which include the scroll buttons mentioned above, an execution button ('Open' shown in FIG. 21), etc. It is also possible to cancel the power saving mode initiated by the operation of this execution button. Namely, as shown in FIG. 21(c), when the execution button is operated, the power saving mode is canceled. At the same time, an application program corresponding to the information displayed on subordinate display section 120 is activated. In this example, the browser program is activated, the URL currently displayed is accessed, and the Web page corresponding to the URL is displayed on the main display section.

Also, as described earlier, it may also be possible to display an electronic mail address on subordinate display section 120 (electronic mail address is also a kind of URL). According to this method, when the power saving mode is canceled while the electronic mail address is displayed, the electronic mail program is activated. Then the electronic mail program displays a screen for editing the electronic mail to be sent to the electronic mail address of interest.

Figure 22:
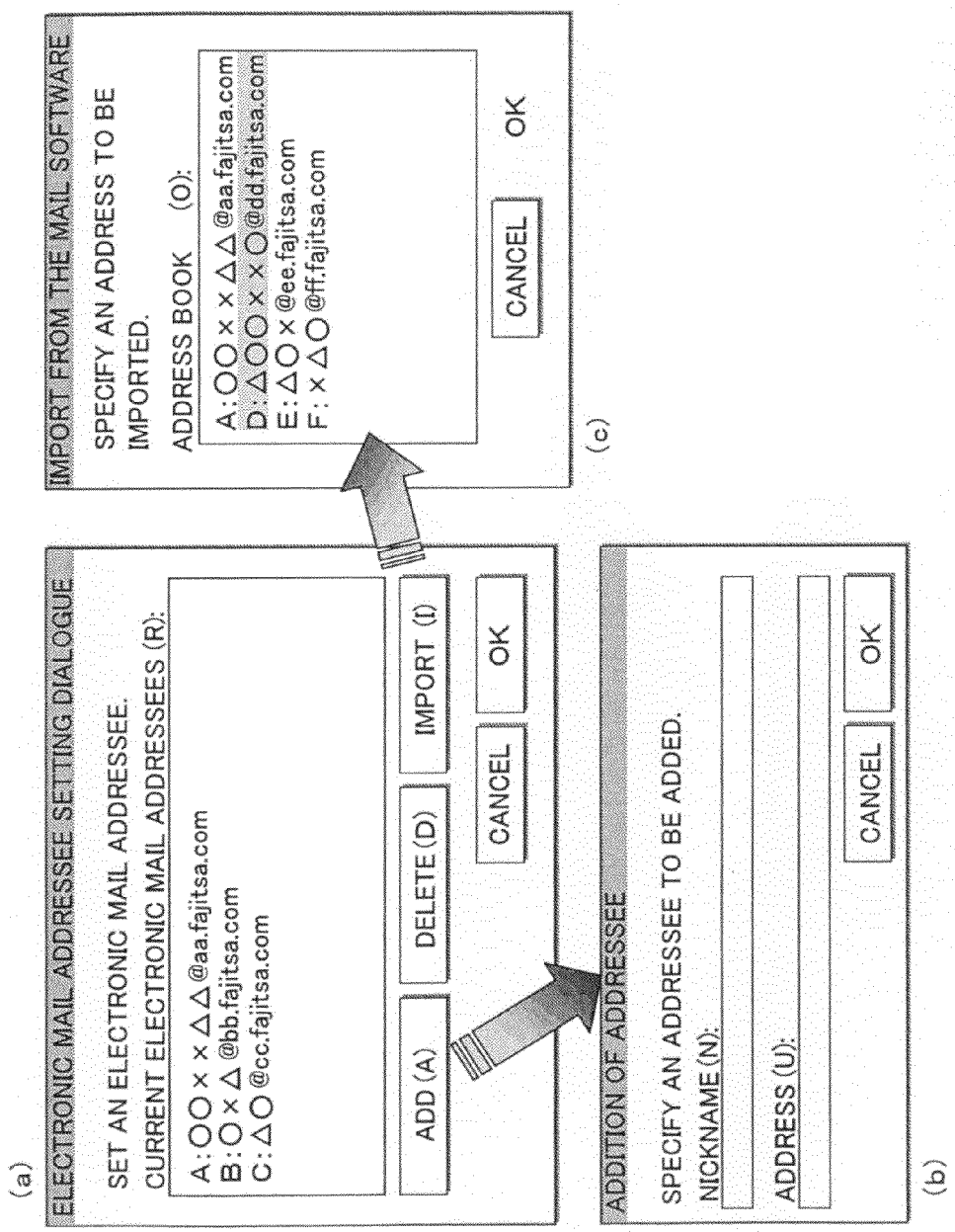
FIG. 22 shows a diagram explaining setting of an electronic mail address.

FIG. 22 shows a diagram illustrating the setting of the electronic mail address. In the normal mode, the user sets the electronic mail address against a predetermined utility program for setting the electronic mail address.

Figure 23:
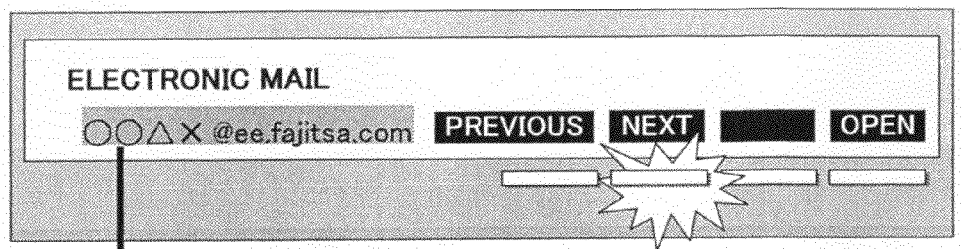
FIG. 23 shows a diagram illustrating a display example of an electronic mail address (URL) on subordinate display section 120.
Figure 23:
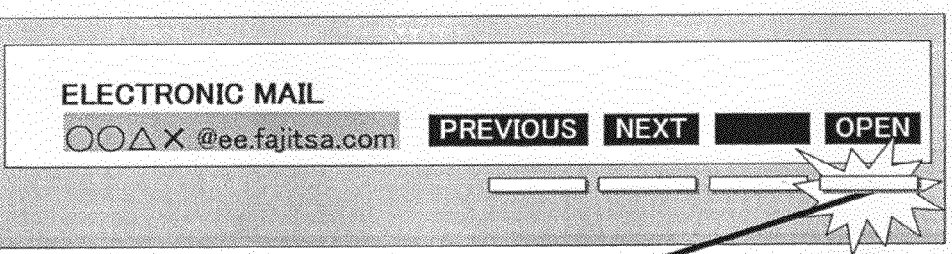
Figure 23:
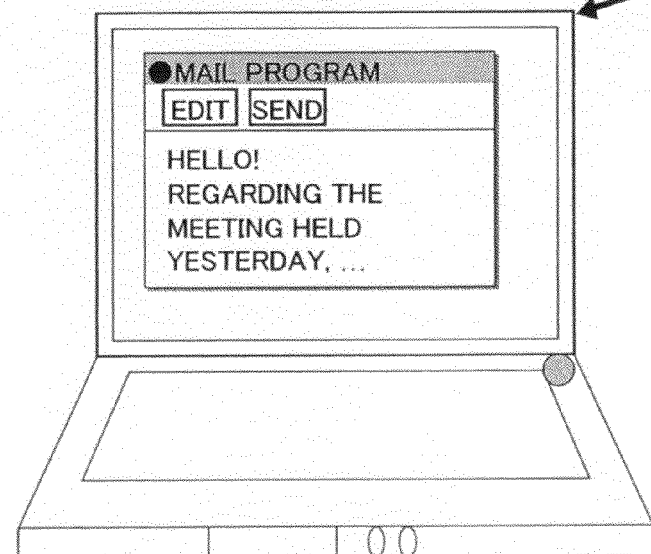

FIG. 23 shows a diagram illustrating a display example of the electronic mail address (URL) on subordinate display section 120. When a plurality of electronic mail addresses are registered, a display of an electronic mail address can be altered to other electronic mail address by operating the scroll buttons ('Previous' and 'Next') designated by subordinate display section 120, as shown in FIGS. 23(a) and 23(b).

As shown in FIG. 23(c), when the execution button is operated, the power saving mode is canceled. At the same time, an application program corresponding to the information displayed on subordinate display section 120 is activated. In this example, the electronic mail program is activated, and an edit screen for editing the electronic mail to be addressed to the currently displayed electronic mail address is displayed on main display section 114.

Here, instead of displaying the electronic mail editing screen, information necessary for identifying each mail of new arrival may be displayed on subordinate display section 120 during the power saving mode. When the cancellation operation of the power saving mode is performed, detailed contents of the new electronic mail corresponding to the mail having been displayed on subordinate display section 120 may be displayed on main display section 114 by the electronic mail program. Here, as information for identifying each mail, there may be applicable a title, an electronic mail address, a sender's name (which is either extracted from 'From . . . ' included in the header information of the new mail, or searched from an electronic mail address book by use of the mail address included in the 'From . . . '), or text contents. The detailed processing is the same as the processing described later with respect to a foldable terminal device. The description is therefore omitted here.

Figure 24:
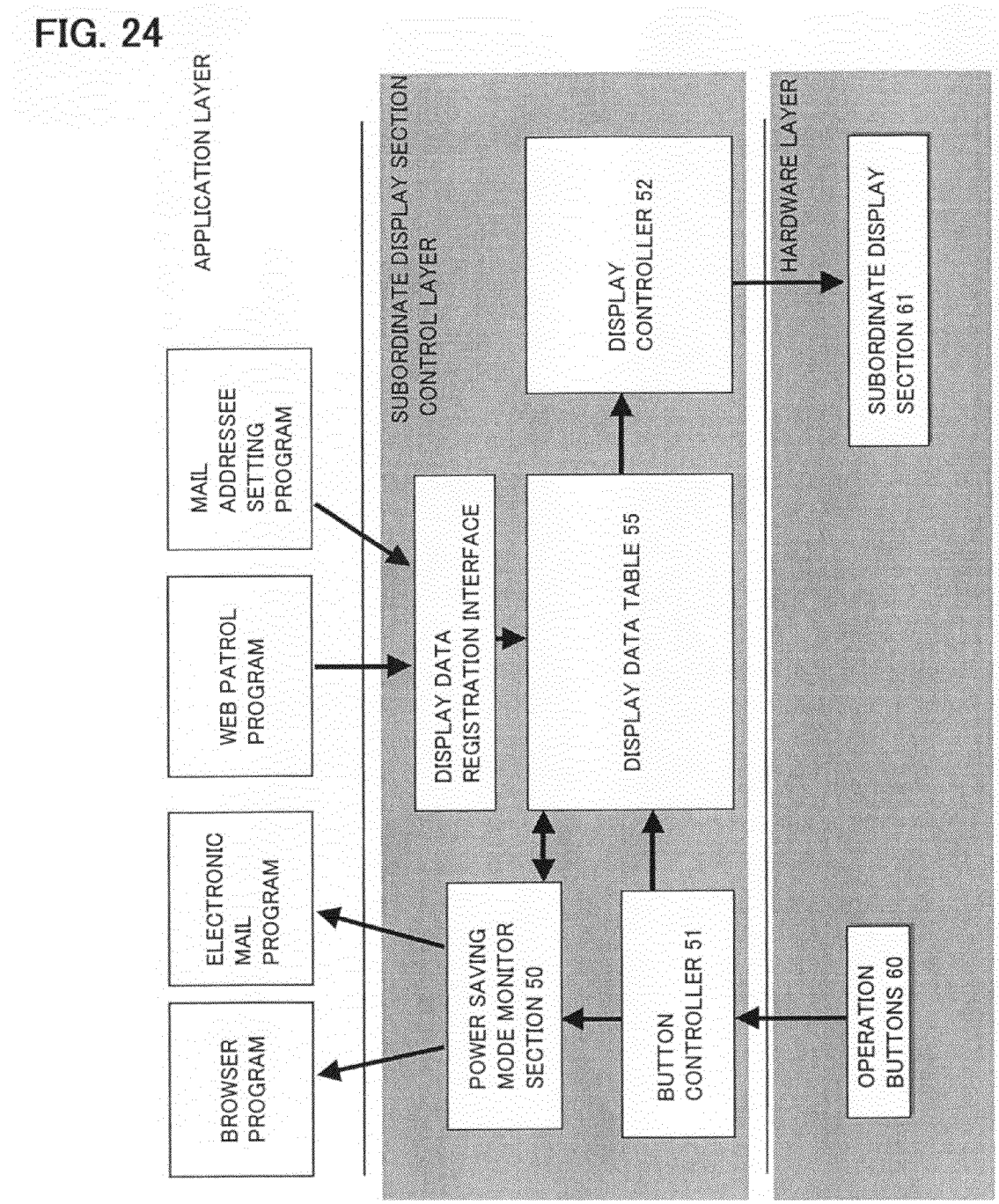
FIG. 24 shows a diagram explaining URL display control against subordinate display section 120.

FIG. 24 is a diagram illustrating the URL display control against subordinate display section 120. The URLs are registered as display data into a display data table 55 in URL memory 124 by the automatic patrol program and the utility program for setting electronic mail addresses provided in the application layer, through a display data registration interface provided in the subordinate display section control layer.

In the power saving mode, a power saving mode monitor section 50 provided in subordinate display section control layer detects the cancellation operation of the power saving mode. This cancellation operation is, for example, an operation of opening a lid of the notebook personal computer, an operation of the mouse or the keyboard, or a depression of the execution button among the operation buttons 60. On detection of such a cancellation operation, the power saving mode is canceled.

When the depression of the operation button 60 in a hardware layer is detected, a button controller 51 reports type information of the depressed button among operation buttons 60 to power saving mode monitor section 50, and also executes a processing corresponding to the depressed operation button.

On detection of a depression of a display selection button (scroll button) in operation buttons 60, button controller 51 obtains a display data corresponding to the operation from display data table 55, and reports this data to a display controller 52 as a request for display (including the identification number shown in FIG. 13). Display controller 52 displays the URL corresponding to the identification number on subordinate display section 120. Power saving mode monitor section 50 does not cancel the power saving mode even when receiving the notification on the depression of the display selection button from button controller 51.

When the execution button is depressed, button controller 51 notifies power saving mode monitor section 50 that the execution button was depressed. On reception of the notification of the execution button, power saving mode monitor section 50 cancels the power saving mode. Further, power saving mode monitor section 50 obtains from display data table 55 a URL corresponding to the display data displayed on subordinate display section 120, and activates an application program corresponding to the obtained URL. For example, when the URL is a Web page address, the browser program is activated, or when the URL is an electronic mail address, the electronic mail program is activated. The type of URL can be obtained by analyzing the URL format, as mentioned earlier.

The embodiment of the present invention is not limited to apply to a computer terminal such as a notebook personal computer. For example, the embodiment is also applicable to a terminal such as a portable telephone having a main display unit and a subordinate display unit.

Further, according to the embodiment of the present invention, in addition to a above-mentioned terminal which executes processing corresponding to the information displayed on the subordinate display section in response to the cancellation of the power saving mode, the following terminal is exemplified, as clarified below. Namely, there is exemplified a terminal device such as a notebook personal computer and a foldable portable telephone having both a subordinate display unit (subordinate display section) and a rear face key on the rear face, which is provided with a folding mechanism by which the body can be opened and closed only the subordinate display unit screen can be viewed in the closed condition. In response to the open motion of the folding mechanism from the closed condition, there is executed a processing corresponding to the information displayed on the subordinate display unit.

As one example, the foldable portable telephone having the subordinate display unit and the rear face key on the rear face is described in the following.

Figure 25:
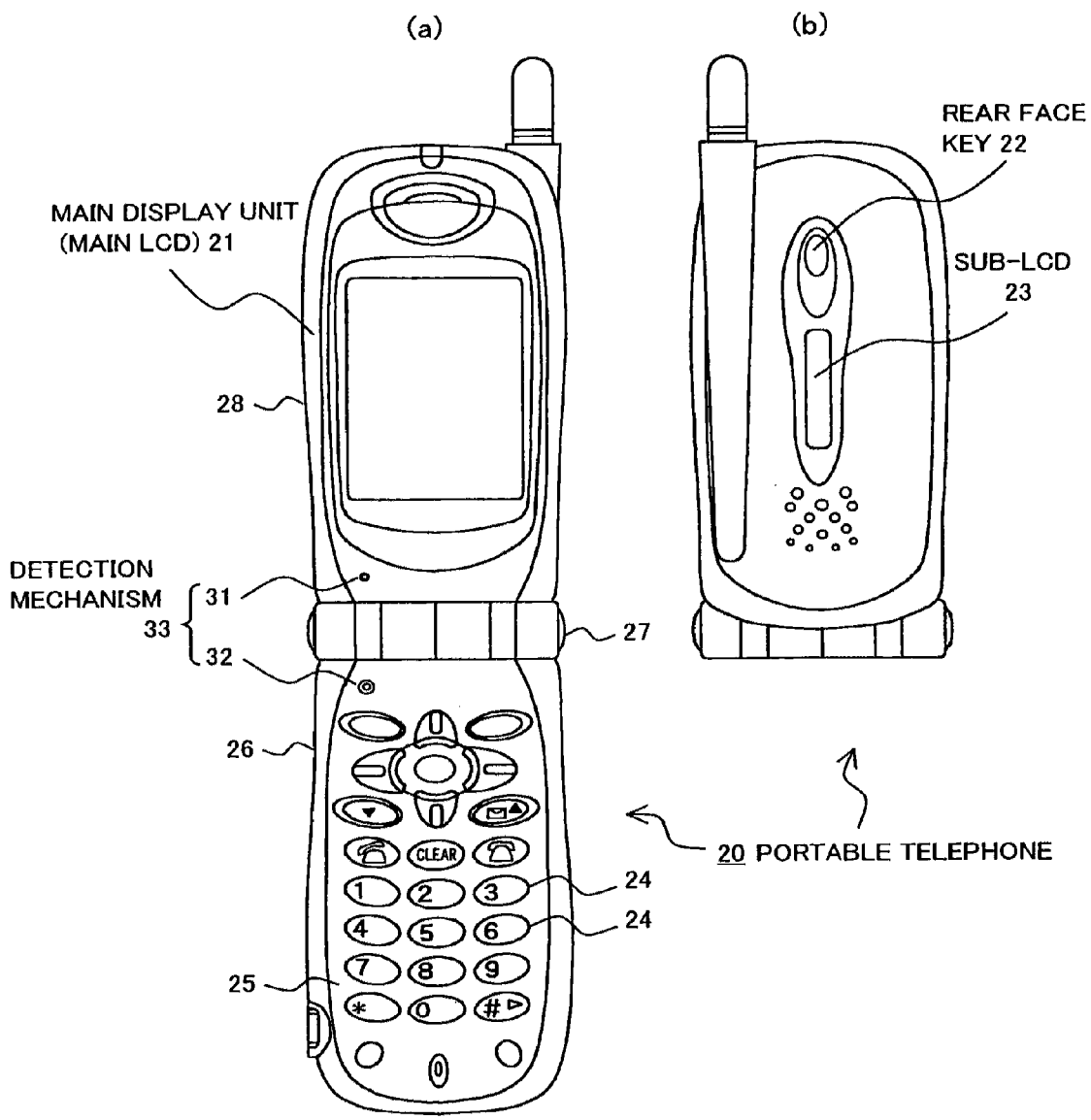
FIG. 25 shows a diagram illustrating an example of outer view of a foldable portable telephone.

FIG. 25 shows a diagram illustrating an exemplary outer view of the foldable portable telephone. FIG. 25(*a*) is an outer view of the foldable portable telephone in the open condition. Also, FIG. 25(*b*) is an outer view of the foldable portable telephone in the closed condition.

A portable telephone 20 is provided with an operation section side 26 constituted of a main operation section 25 having a plurality of key buttons 24, and a display section side 28 constituted of a main display unit (main LCD) 21 which is able to swing (foldable) via a swing axis section 27 disposed on an end portion of the above-mentioned operation section side 26. In the open condition of portable telephone 20, operation section 25 is operable and also main display unit (main display section) 21 can be viewed. In the closed condition produced by the folding operation, these operation section side 26 and display section side 28 are mutually closed into a compact form, thus becoming isolated from outside.

In the vicinity of swing axis section 27, there is provided a detection mechanism 33 as a detection means for detecting the open condition or the close condition of portable telephone 20. This detection mechanism 33 is constituted of a depression section 31 protruded from the display section side 28 of the body surface, and a depression switch 34 (refer to FIG. 26) disposed in a concave 32 formed on the operation section side 26 of the body surface, in which the switch is closed because of the pressure from depression section 31.

FIG. 26 shows a diagram illustrating the detection mechanism for detecting the open condition and the close condition of portable telephone 20. As shown in this figure, a switch pad 342 is disposed inside a rib 341 provided on the rear face of the body, so that switch pad 342 can travel in a vertical direction and is resiliently pressed in an upward direction by a non-illustrated spring (either a coil spring or a flat spring). By depressing this switch pad 342 downward against a resilient force of the spring, a predetermined terminal member 344 disposed on the base portion of concave 32 contacts to the ground 345. By use of the aforementioned mechanism, an electric potential of terminal member 344 enables to detect the open and close conditions.

As shown in FIG. 25(*b*), on the rear face of main display unit 21, a rear face key 22 provided as an operation button is disposed in a position close to a subordinate display unit (sub-LCD) 23.

Rear face key 22 is controlled so as to light on or blink. Rear face key 22 is for use in displaying a variety of operation conditions, switching the displays on subordinate display unit (subordinate display section) 23, and so on. In addition, by continuously depressing this rear face key 22 for a predetermined time, it may be possible to check an arrival of a new mail against a mail server, and, when existent, download the new mail.

Subordinate display unit 23 is for use in displaying a variety of conditions and information initiated by an operation of rear face key 22. For example, date and time, mail arrival information, URL list, and arrival voice call information are displayed alternatively For example, the display sections are configured with the specifications that the main display unit can display 10 lines with 10 characters per line, and the subordinate display unit can display 6 characters per line in a full-size character format.

Figure 27:
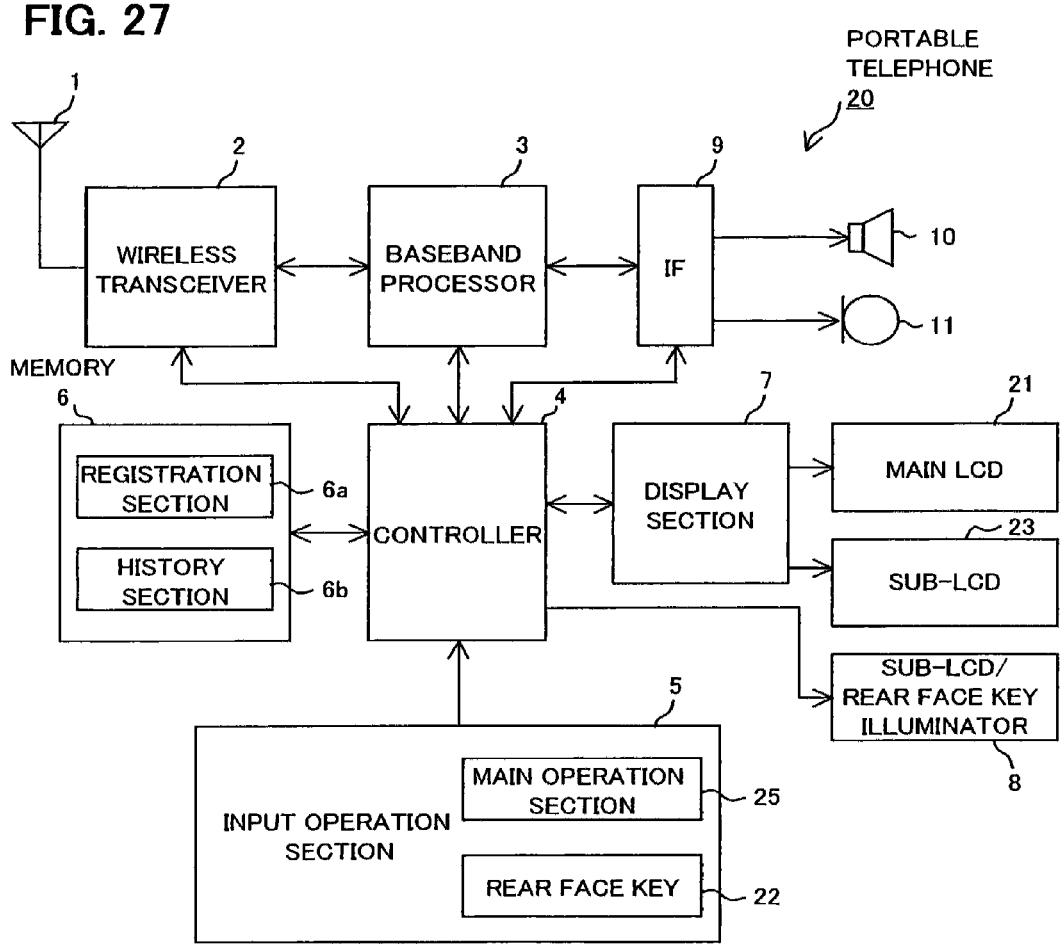
FIG. 27 shows a block diagram schematically illustrating one example of a hardware configuration of portable telephone 20.

FIG. 27 shows a block diagram which schematically illustrates an exemplary hardware configuration of portable telephone 20. AS shown in this FIG. 27, portable telephone 20 is constituted of a wireless transceiver 2 having an antenna 1, a baseband processor 3, an input operation section 5 for inputting a telephone number or information through key operation of the user, a memory 6 having a registration section 6*a* and a history section 6*b*, a display section 7, a subordinate display unit 23 and a rear face illuminator 8, which are respectively connected to a controller 4. Further, there are provided a speaker 10 and a microphone 11, each connected to controller 4 through an interface (IF) 9.

Controller 4 is constituted of a microprocessor unit (MPU), or the like, which executes operation control of this unit according to a program.

Input operation section 5 includes rear face key 22, in addition to a variety of keys provided on main operation section 25.

Display controller 7 is connected to main display unit (main LCD) 21 and subordinate display unit 23 and performs display control against the respective display units 21 and 23.

In memory 6, there are stored programs which control operation of this terminal device including data communication. A program executing the processing of the present invention is also stored in memory 6.

In a registration section 6*a* of memory 6, there are registered a telephone directory data which includes a personal name, reading, a telephone number, an electronic mail address, a resident address, etc.; a URL list; mail data in the electronic mail function including a received mail and a created mail; a voice message; a downloaded application program; and a variety of setting information in the portable telephone; etc.

In history section 6*b* of memory 6, history information is stored, which includes a voice call origination history and a voice call termination history.

A variety of exemplary processing performed in the foldable portable telephone in response to the opening operation thereof will be described hereafter.

[An Example of Accessing a Web Page]

In the following, there is explained an example in which a URL list is displayed on the subordinate display unit, when a desired URL is displayed, the URL is accessed and the Web page is obtained by opening the portable telephone, and the obtained Web page is displayed on the main display unit.

The portable telephone retains a URL list (which is also referred to as a bookmark). As shown in the following, this URL list includes the number of registration items, and corresponding information of titles and URLs, in which each item is registered as one record. In addition, among the records registered in the URL list, one selected record is designated as an object record.

[An Example of URL List Data Structure (In Case of 5 Registration Items)]

5

Mr. AB's page http://www.ab.com/

Mr. CD's page http://www.cd.com/

:

The information in this list may be input directly by a user, or it may also be possible for the user to register the URL of a Web page which is currently seen together with the title (identification information) of the page by performing a predetermined operation during browsing. In the registration operation performed during browsing Web pages, a description depicted in a <TITLE> tag in the HTML source codes of the Web page is registered as a title in this URL list.

Also, it is possible for the user to edit the registration information after the above-mentioned input or registration is performed.

Figure 28:
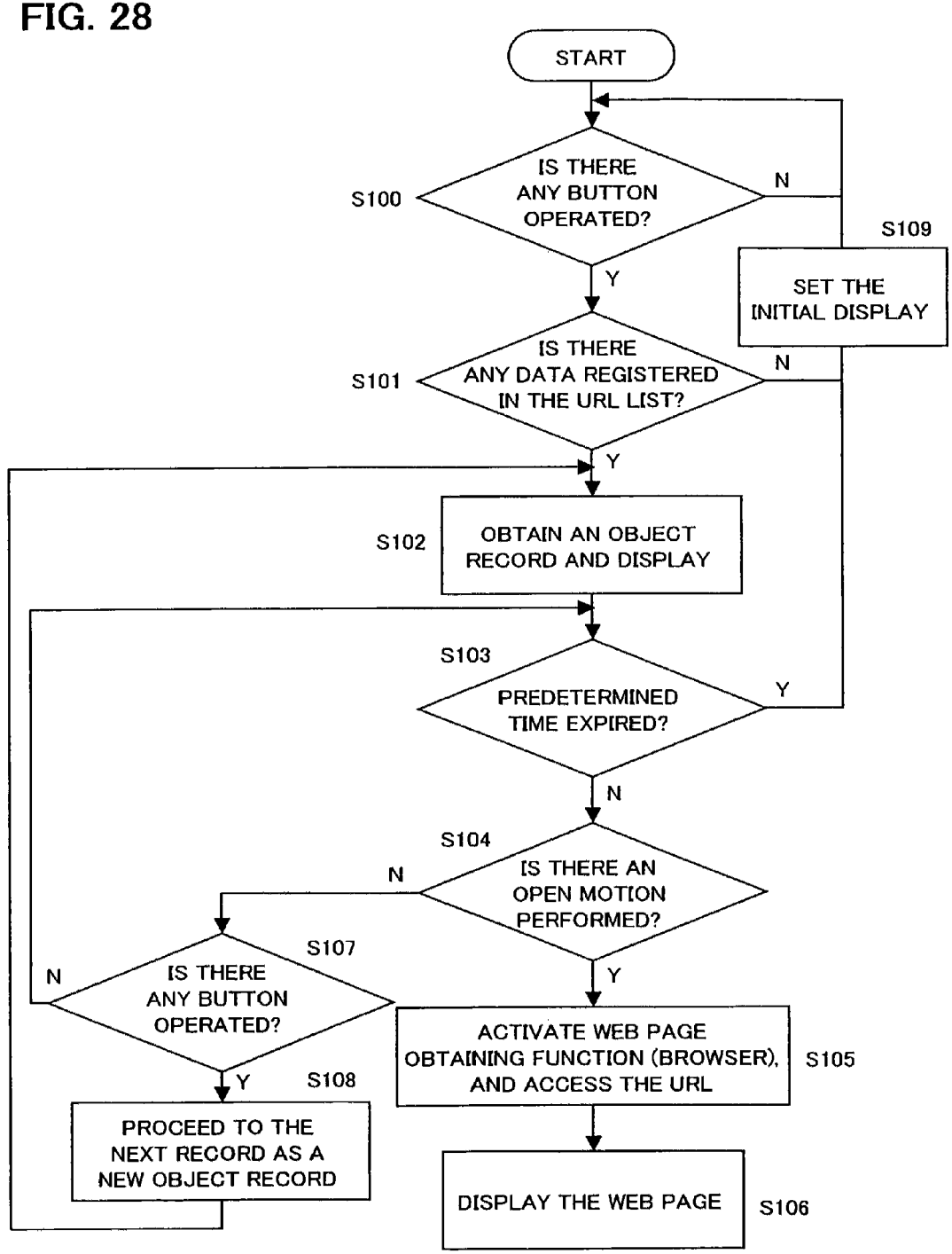
FIG. 28 shows a first processing flowchart in the portable telephone in accordance with the embodiment of the present invention.

FIG. 28 shows a first processing flowchart in the portable telephone in accordance with the embodiment of the present invention. When the portable telephone detects an operation (depression) of a rear face key 22 (hereinafter referred to as button) by the user (S100), the portable telephone obtains the number of registration items by accessing the URL list (S101). When the number of registration items is nil, subordinate display unit 23 is restored to the initial condition before the button operation (S109), and the process is terminated. When the number of registration items is one or more, the title and URL in the object record of the URL list are obtained, and the obtained title and URL are displayed on subordinate display unit 23 (S102).

Figure 29:
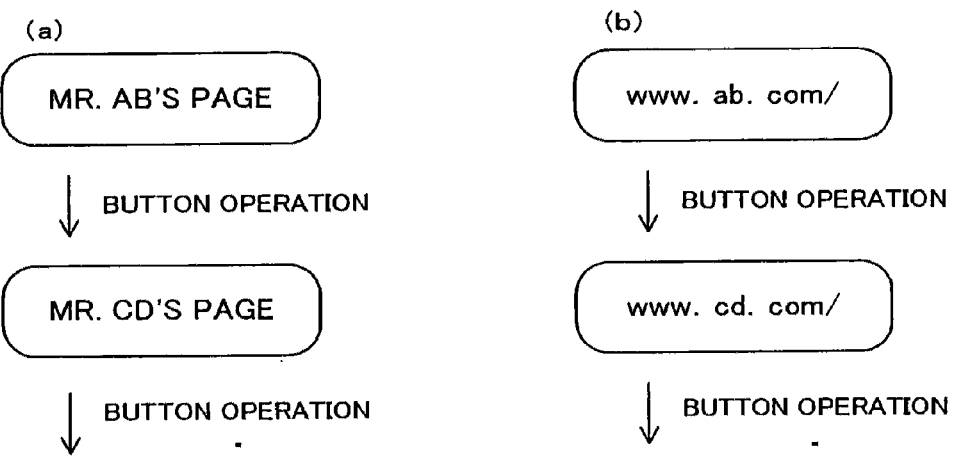
FIG. 29 shows display examples of an object record title (a), or a URL (b) on a subordinate display unit 23.

FIG. 29 shows display examples of title (a), and URL (b), of the object record, which are displayed on subordinate display unit 23. As will be described later, the display contents are changed in accordance with changing the object record by the button operation. Here, in FIG. 29(b), the protocol descriptions (http://) are omitted in the display contents.

Referring back to FIG. 28, on detection of the open motion of the portable telephone (S104) within a predetermined time after the display of the title or the URL (S103), a browser program is activated based on the display of the URL list, and a Web page is obtained by accessing the obtained URL (S105). The obtained Web page is displayed on main display unit 21 (S106).

Figure 30:
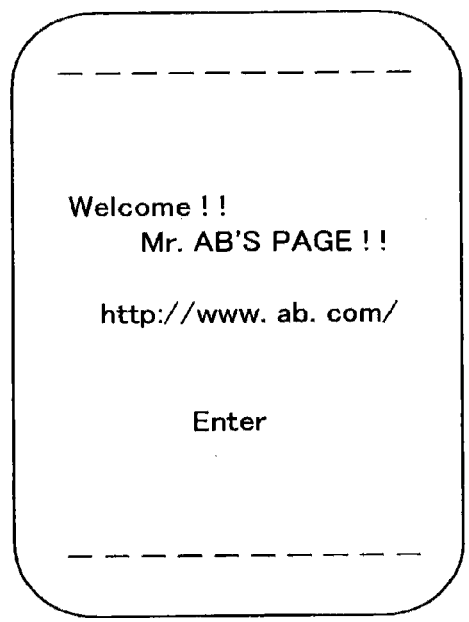
FIG. 30 shows a display example of a Web page on a main display unit 21.

FIG. 30 shows a display example of the web page displayed on main display unit 21. In this FIG. 30, there is shown a display example when the open motion of the portable telephone is performed while either 'Mr. AB's page' or 'www.ab-.com' is displayed on subordinate display unit 23.

Meanwhile, on detection of the button operation within the predetermined time after the aforementioned display of the title or the URL (S107), the next record to the current object record in the URL list is newly set as an object record (S108), and the process returns to the step S102. If the current object record is the final record, then the top record is set as the object record. Further, when no user operation has been detected in the predetermined time after the display of the above-mentioned title or the URL, this process is terminated.

In the examples described above, the title and the corresponding URL are obtained at a time. However, it may also be possible to obtain the corresponding URL when the title is determined.

Also, in the processing concerned, when either the complete title or URL is too long to display at a time, it is possible to display the information with scrolling by shifting the display information for a predetermined number of dots at predetermined intervals.

Moreover, the data structure of the URL list, as well as the processing contents, is not limited to the above-mentioned examples. For example, it is possible to configure with a data structure having no registration item information. It is also possible to configure the processing in such a way that, the records are successively read out in response to a user's button operation, and when there becomes no record to be read out, the top record is read out.

Also, in place of the URL list, Web page information of the individuals can be displayed on the subordinate display unit when this Web page information is included in a telephone directory data.

By applying such configurations, it becomes possible to access a desired Web page promptly with simple operations.

[Example of Electronic Mail Function (at the Time of Transmission)]

Next, there will be described an example of displaying addressee information on subordinate display unit 23, and displaying a screen for creating a mail to be sent to the addressee of interest on main display unit 21, by making the portable telephone into an open condition when the displayed addressee information comes to a desired addressee information.

The portable telephone is provided with an electronic mail transmission/reception function by a data communication means. Further, as mentioned earlier, the portable telephone retains the telephone directory data which includes personal name, telephone number, mail address, and resident address. This telephone directory data is constituted of the information containing each corresponding directory item in each record, and the information of the number of registration items.

[A Configuration Example of the Telephone Directory Data (in Case of 100 Registration Items)]

100

Ogawa ogawa 0443701234 ogawa@pc.com 1234, Nakahara-ward, Kawasaki-city, Kanagawa-prefecture.

Tanaka tanaka 0443702345 tanaka@pc.com 2345, Nakahara-ward, Kawasaki-city, Kanagawa-prefecture.

This telephone directory data may be input directly by the user, or created easily by use of a telephone number of an opposite party informed in a terminating call from the opposite party, or by use of an electronic mail address of an opposite party included in a received mail.

Figure 31:
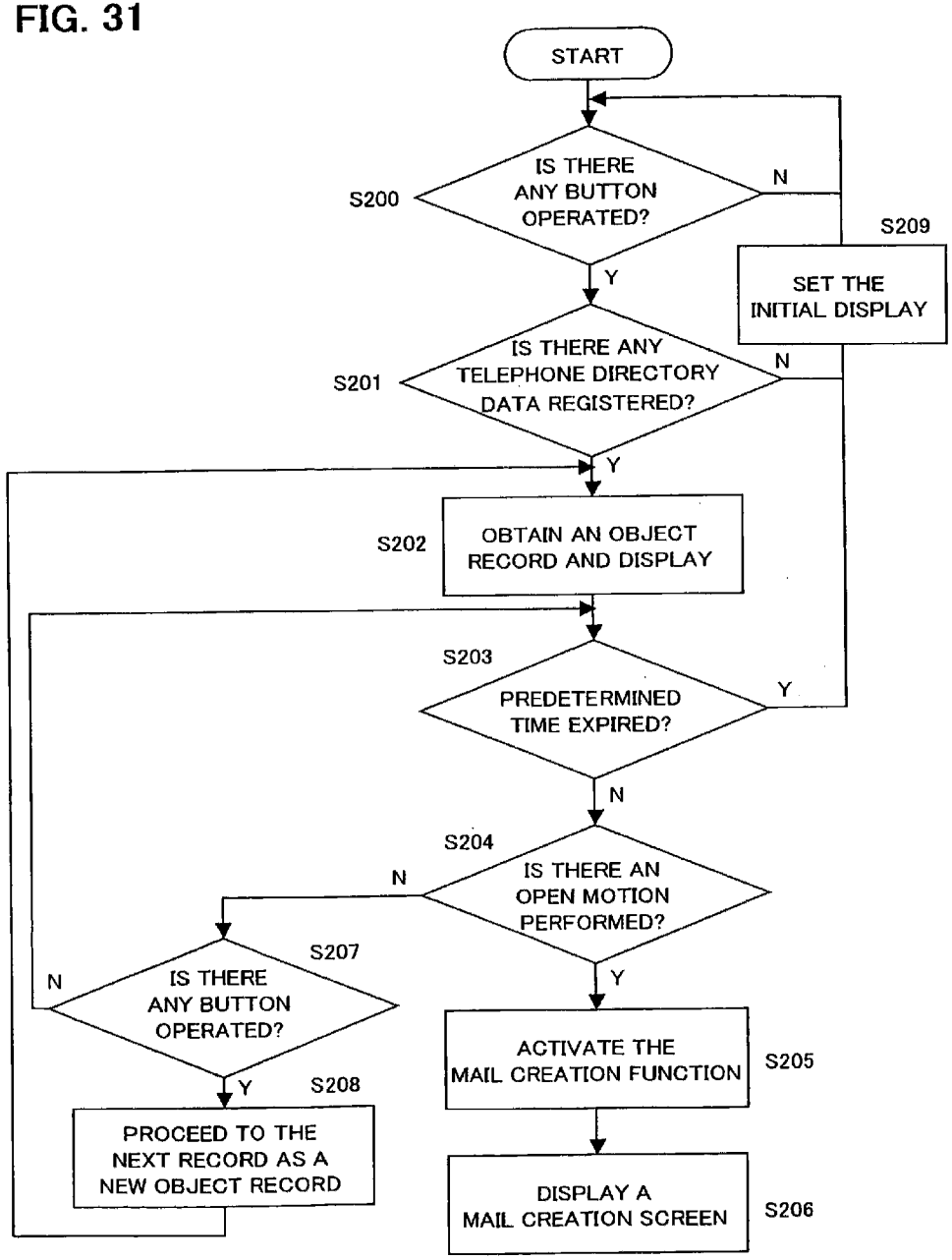
FIG. 31 shows a second processing flowchart in the portable telephone in accordance with the embodiment of the present invention.

FIG. 31 shows a second processing flowchart in the portable telephone in accordance with the embodiment of the present invention. When the portable telephone detects a button operation (depression) by the user (S200), the portable telephone identifies whether or not the registration exists by accessing the telephone directory data (S201). When the number of registration items is nil, subordinate display unit 23 is restored to the initial condition before the button operation (S209), and the process is terminated. When the number of registration items is one or more, a personal name and a mail address in the object record-of the telephone directory data are obtained, and the obtained name (identification information) or mail address are displayed on subordinate display unit 23 (S202). Or, it may be possible to obtain a telephone number (identification information) in the object record and the corresponding mail address.

Figure 32:
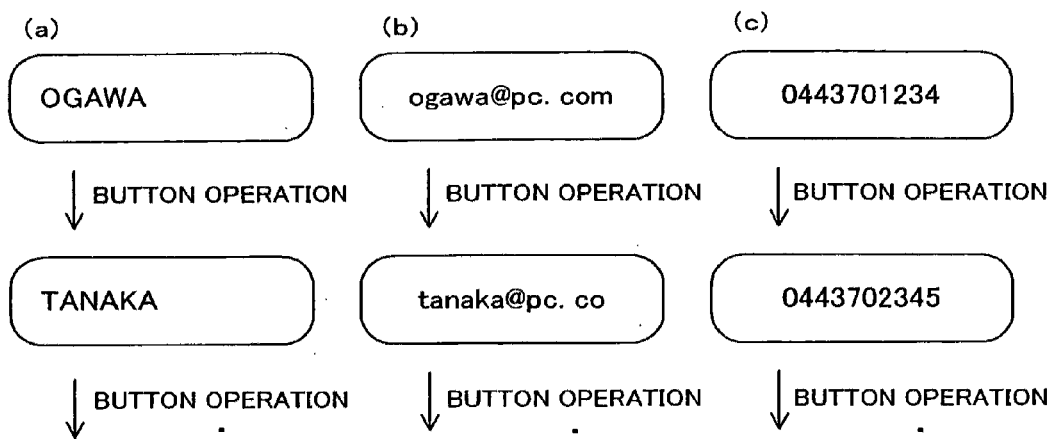
FIG. 32 shows display examples of an object record name (a), or a mail address (b) on subordinate display unit 23.

FIG. 32 shows display examples of name (a) or mail address (b) of the object record, which are displayed on subordinate display unit 23. The display contents are changed in accordance with the change of the object record by the button operation. In addition, FIG. 32(c) shows a display example of a telephone number in the object record.

Referring back to FIG. 31, on detection of the open motion of the portable telephone (S204) within a predetermined time after the display of the name or the mail address (S203), an electronic mail generation function is activated based on the display of the telephone directory data (S205), and a page for creating a mail is displayed on main display unit 21 (S206).

Figure 33:
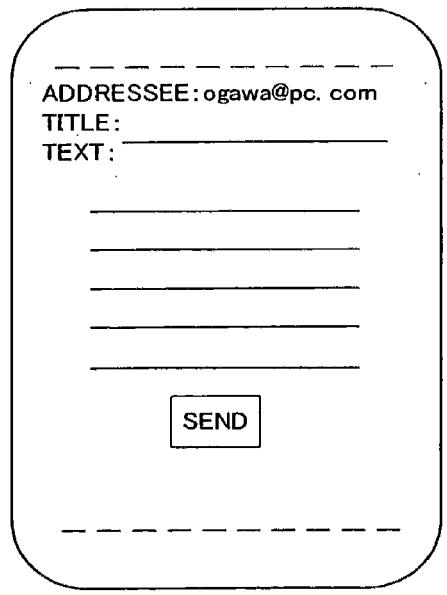
FIG. 33 shows a display example of a mail creation screen on main display unit 21.

FIG. 33 shows a display example of the mail creation page on main display unit 21. In this FIG. 33, there is shown a display example when the open motion of the portable telephone is performed while the name 'Ogawa', the corresponding mail address 'ogawa@pc.com', or the telephone number '0443701234' is displayed on subordinate display unit 23.

In the processing examples described above, the name and the corresponding mail address are displayed at a time. However, it may also be possible to read out only the mail address from the telephone directory data, and display the mail address concerned to the subordinate display unit.

Moreover, it is possible to read out the telephone number and the mail address from the telephone directory data, display the telephone number on the subordinate display unit, and apply the corresponding mail address as an addressee when the telephone number is identified.

Further, in the aforementioned examples, the entire data having been registered in the telephone directory data are used as the objects of the processing. However, it may also be possible to use records having a particular flag in the telephone data, or records belonging to a particular group in case the telephone directory data is managed on a group-by-group basis, as the objects of the above-mentioned processing.

Figure 34:
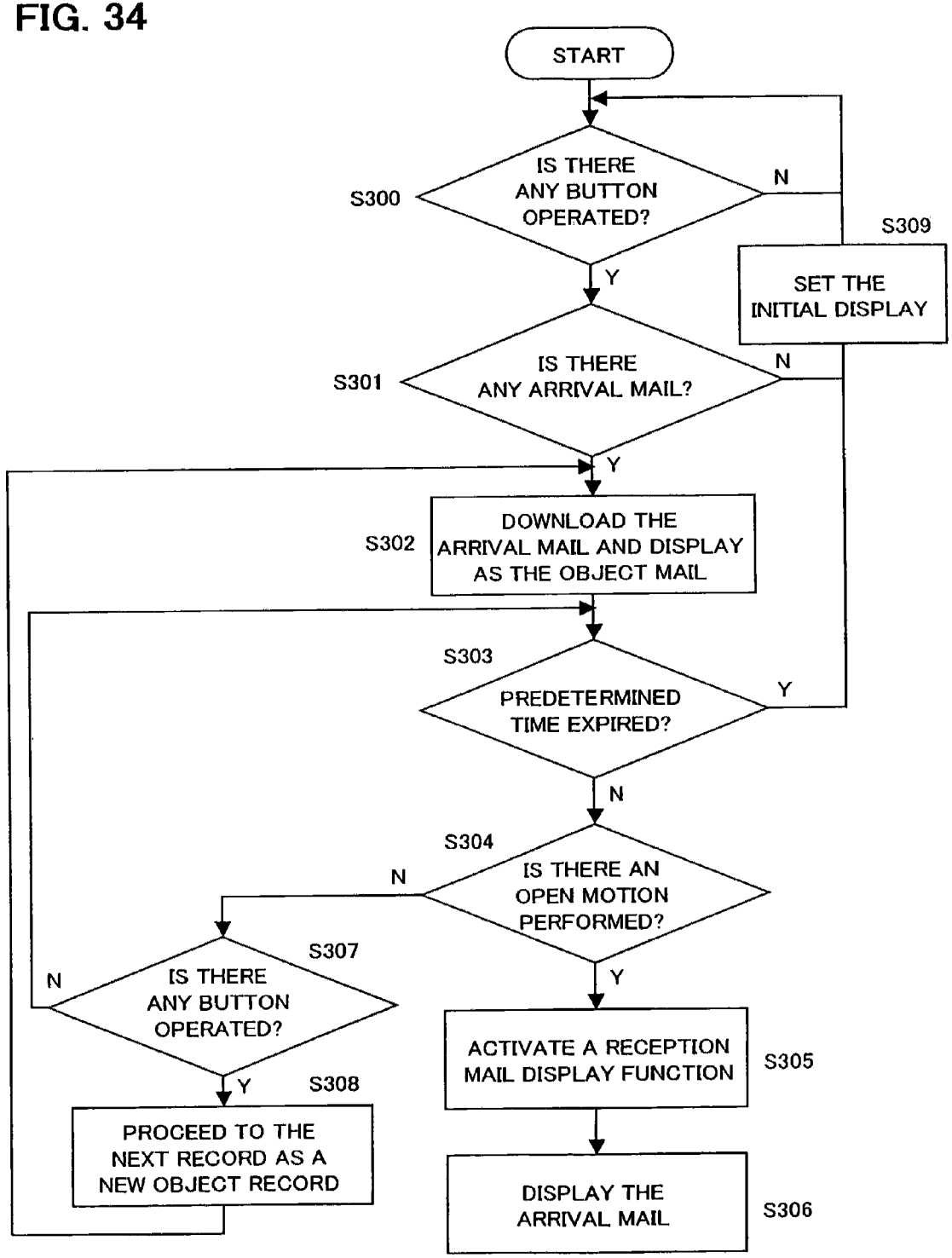
FIG. 34 shows a third processing flowchart in the portable telephone in accordance with the embodiment of the present invention.
Figure 37:
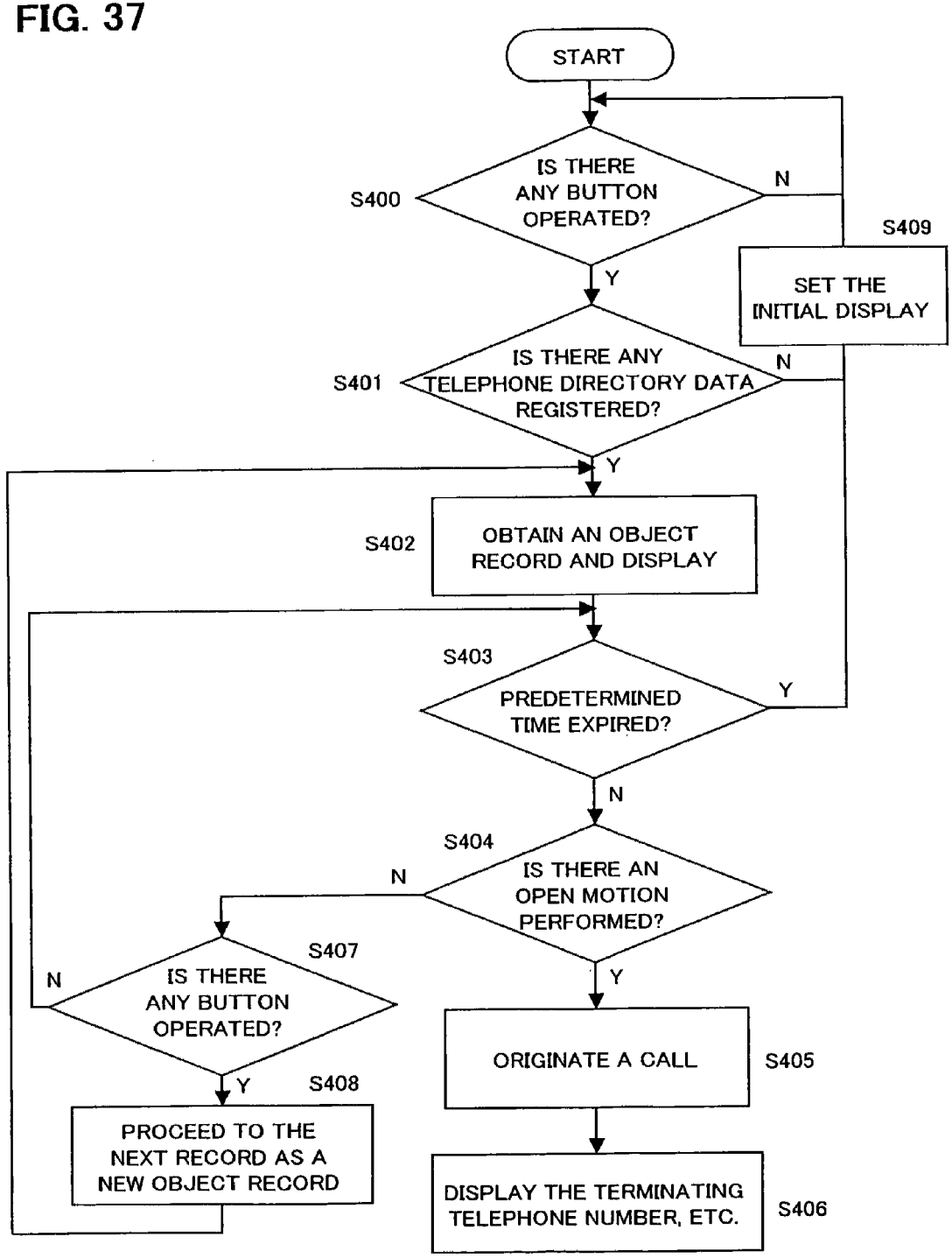
FIG. 37 shows a processing flowchart in the portable telephone in accordance with the embodiment of the present invention.
Figure 40:
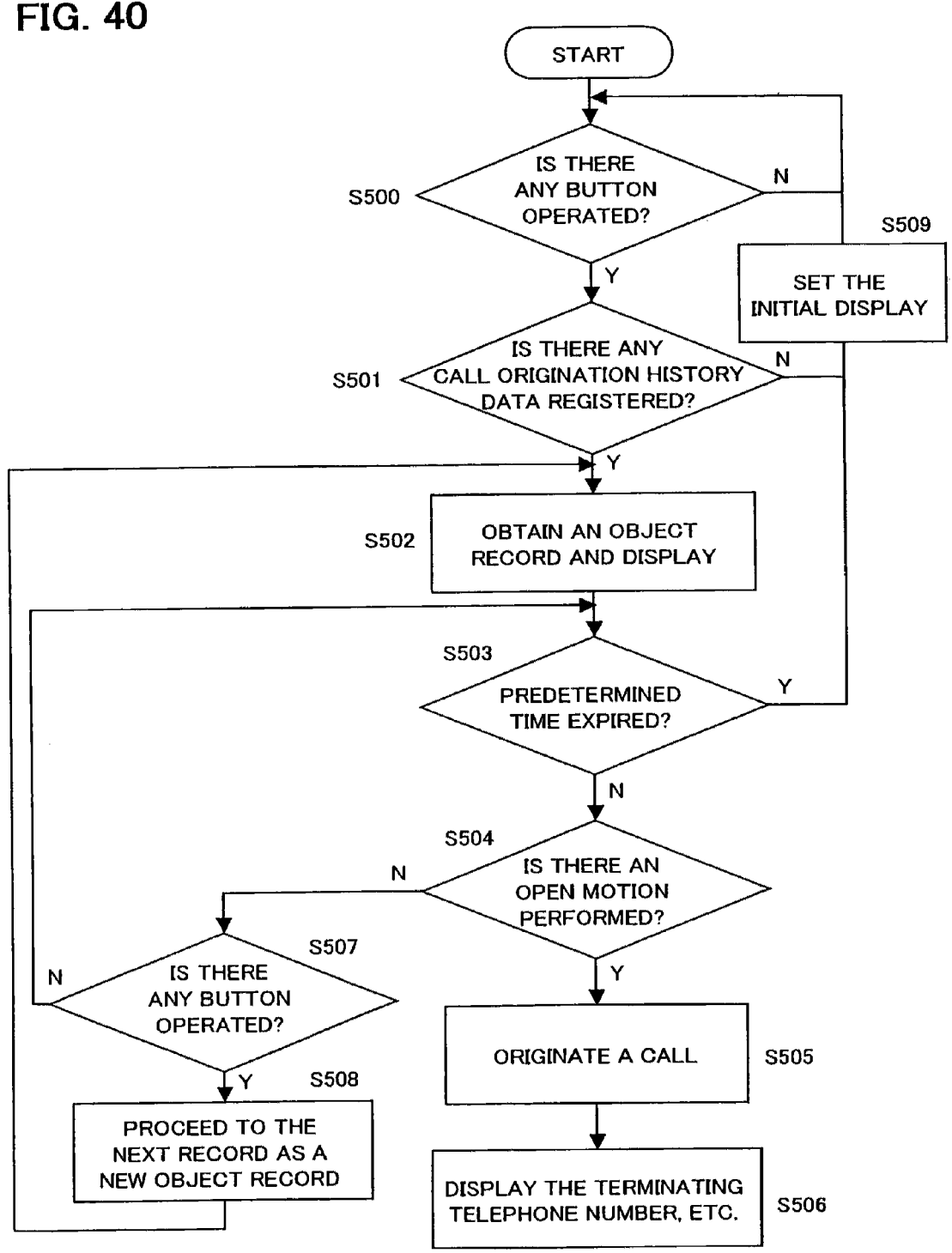
FIG. 40 shows a fifth processing flowchart in the portable telephone in accordance with the embodiment of the present invention.
Figure 41:
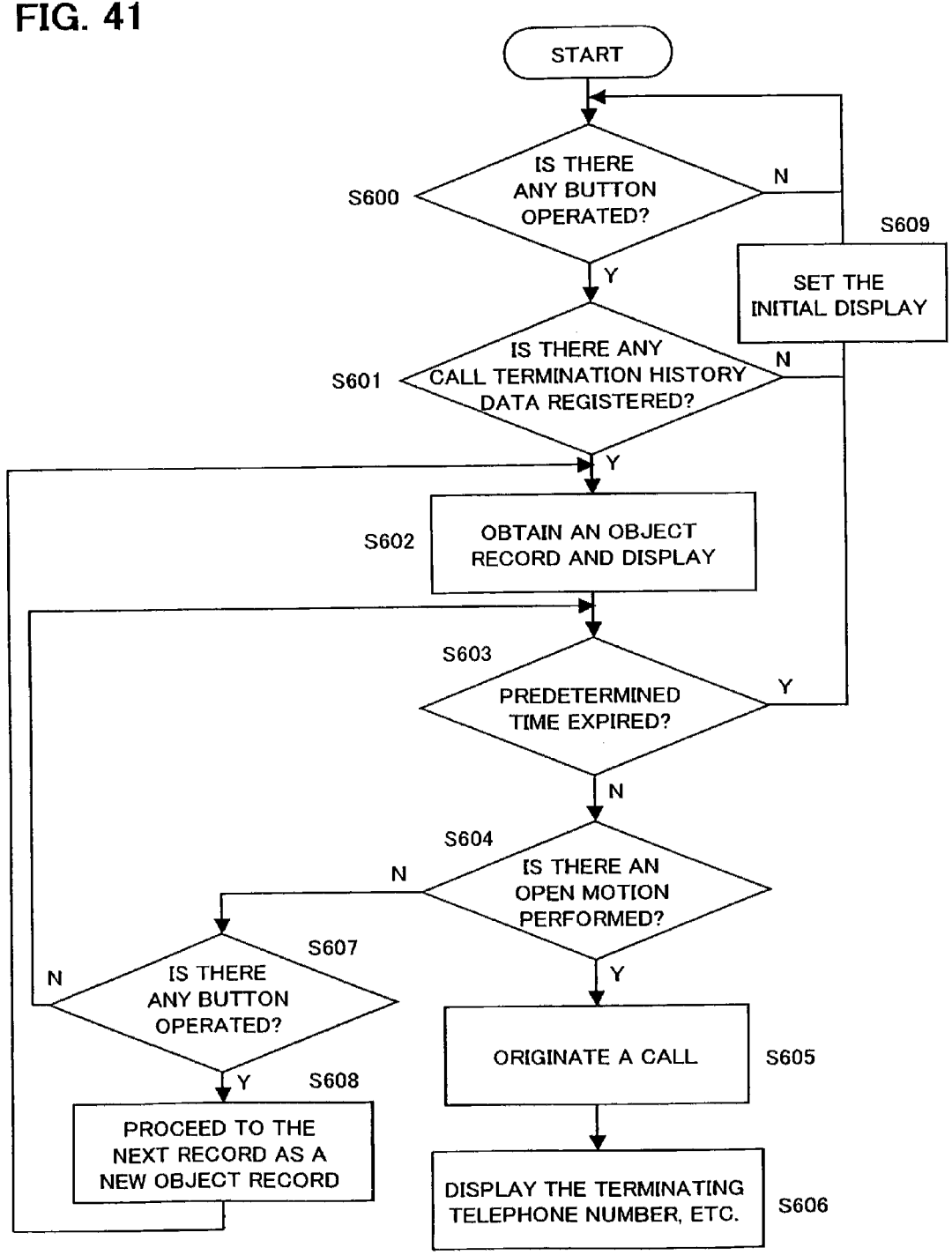
FIG. 41 shows a sixth processing flowchart in the portable telephone in accordance with the embodiment of the present invention.
Figure 42:
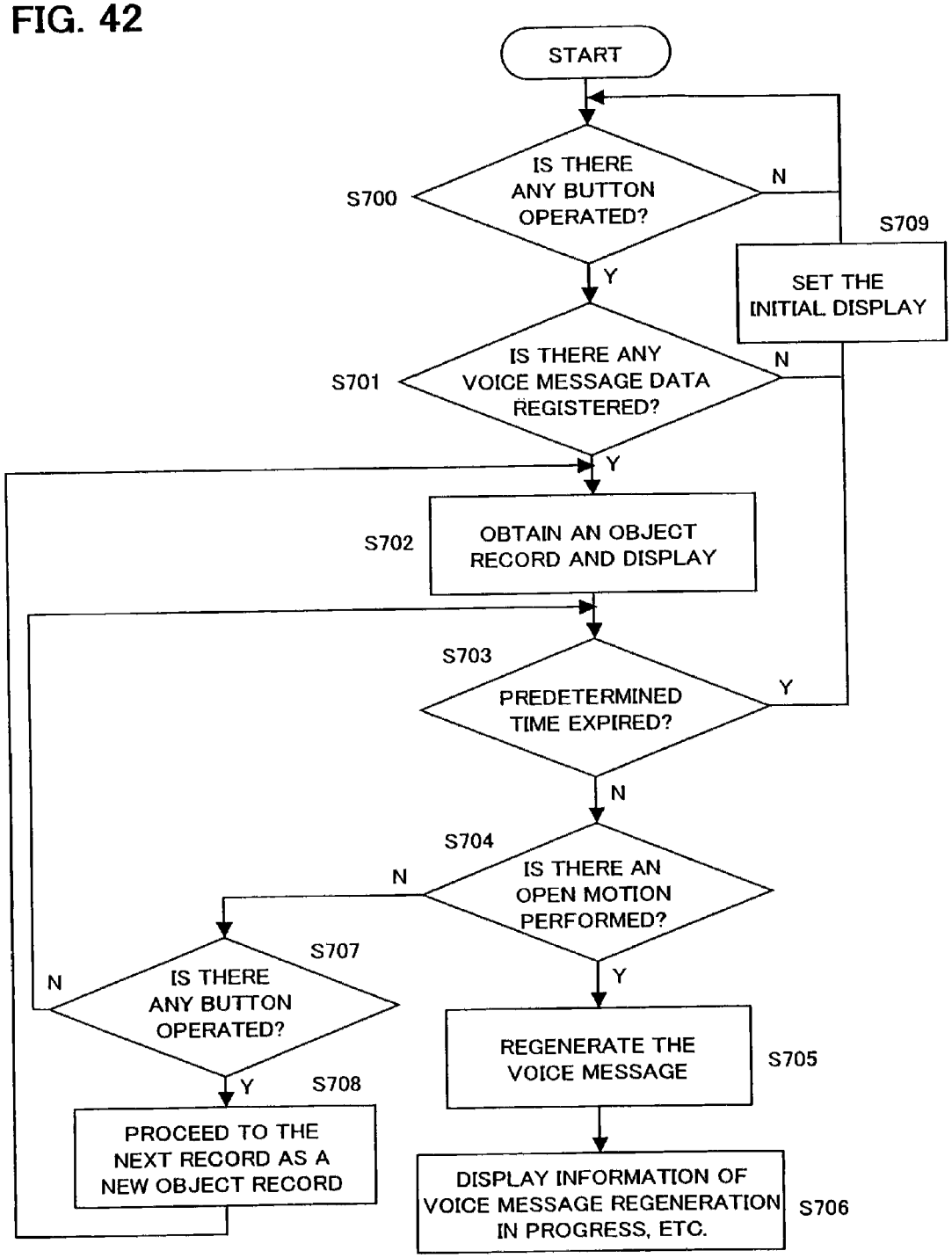
FIG. 42 shows a seventh processing flowchart in the portable telephone in accordance with the embodiment of the present invention
Figure 45:
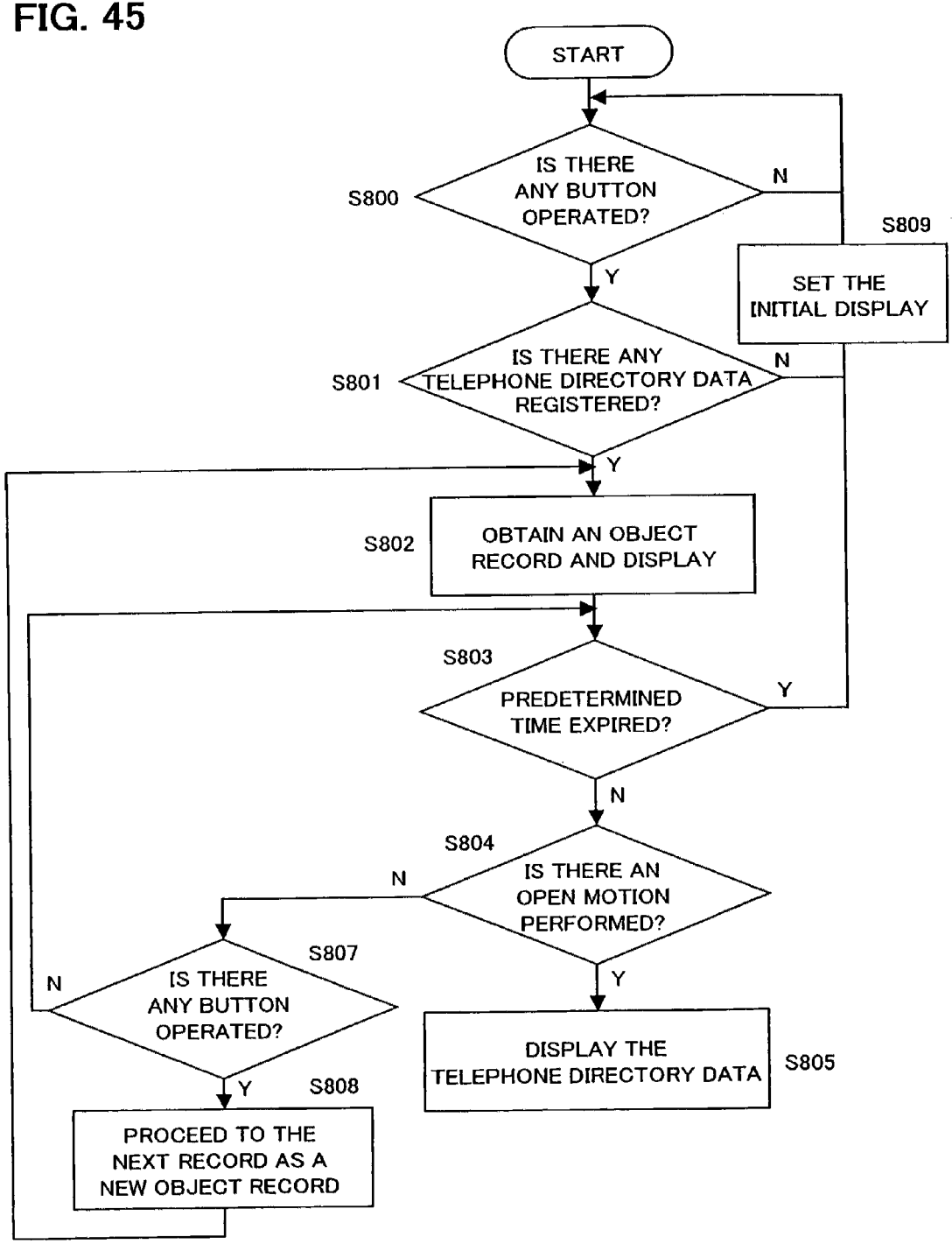
FIG. 45 shows an eighth processing flowchart in the portable telephone in accordance with the embodiment of the present invention.
Figure 48:
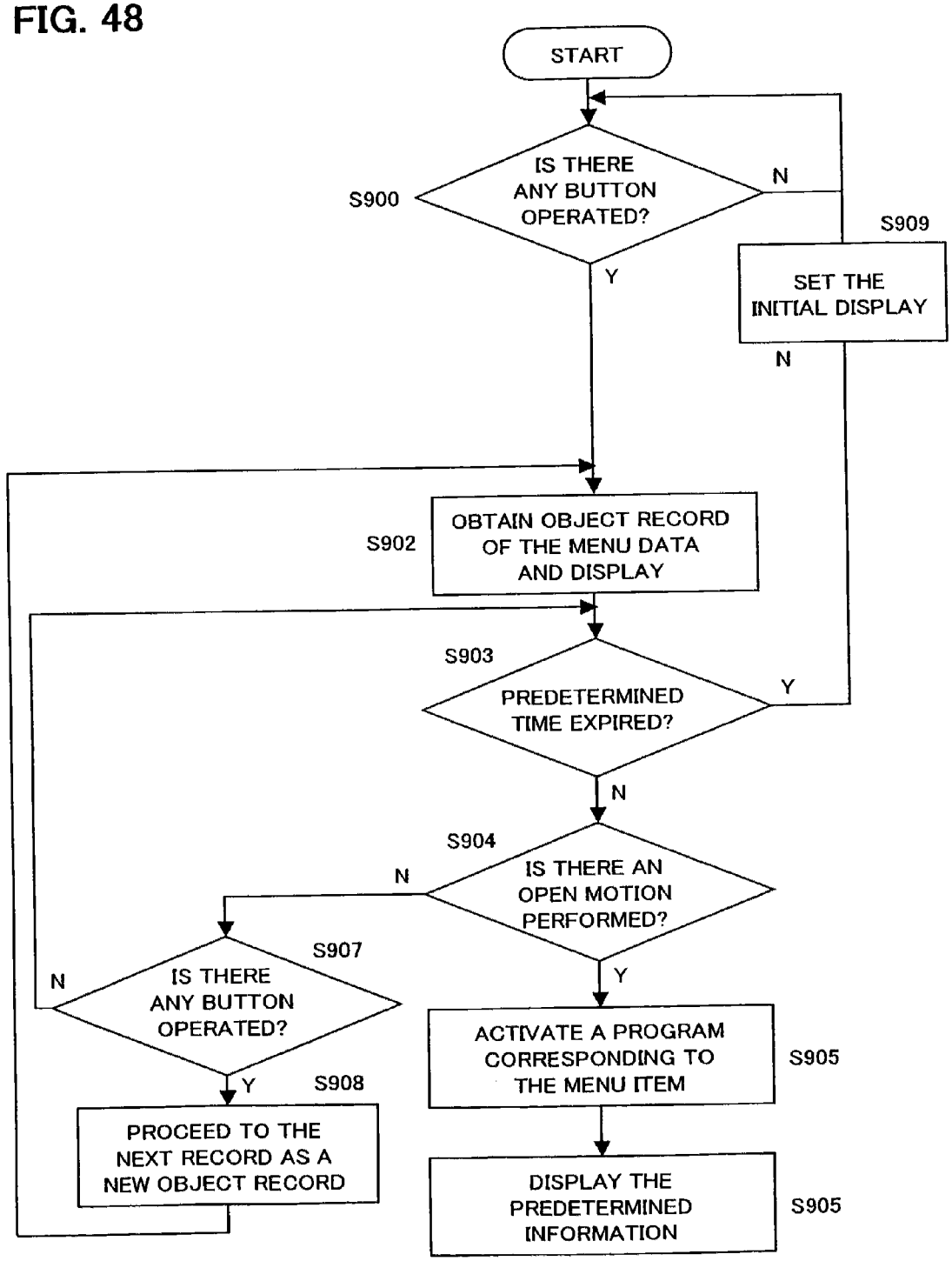
FIG. 48 shows a ninth processing flowchart in the portable telephone in accordance with the embodiment of the present invention.
Figure 51:
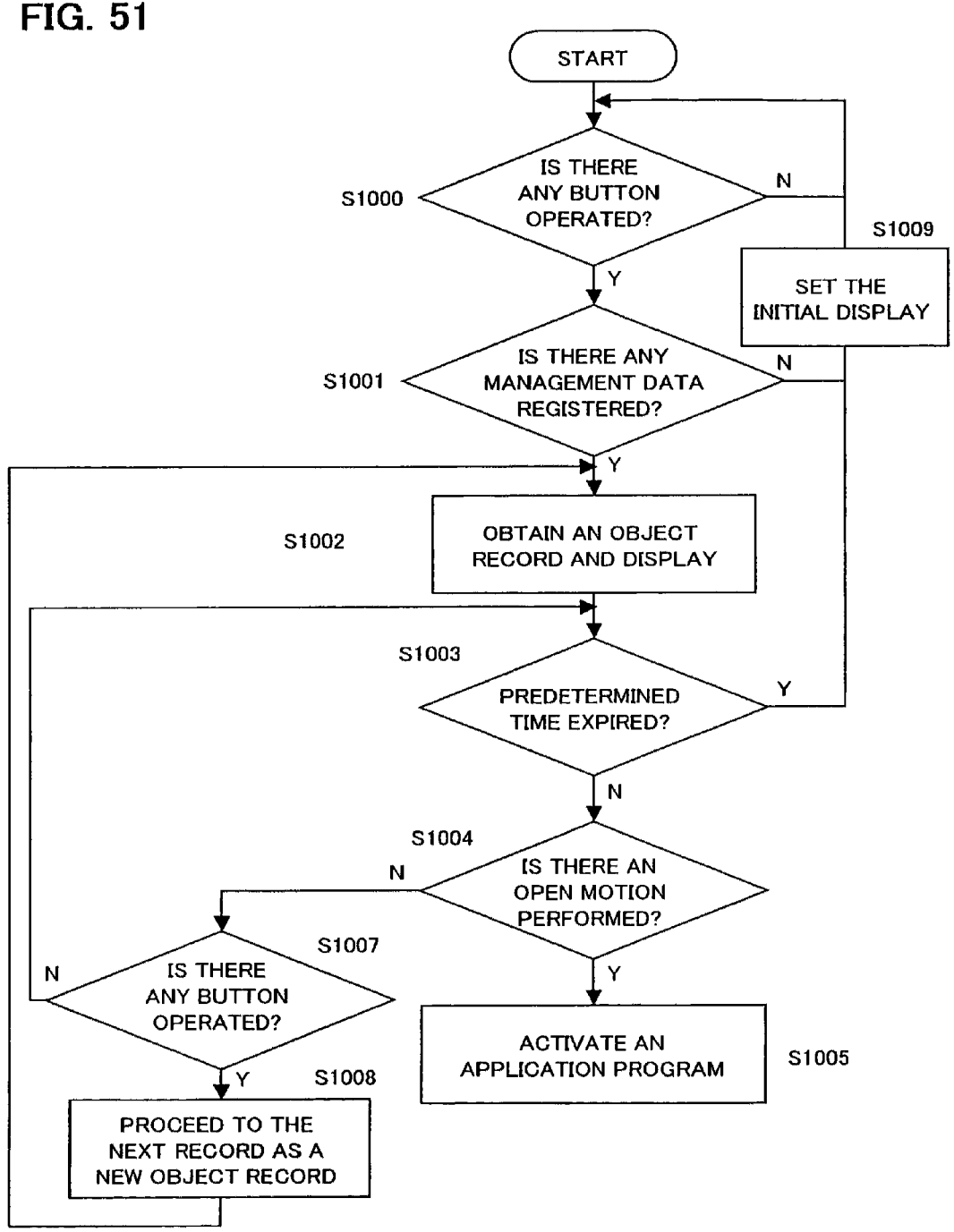
FIG. 51 shows a tenth processing flowchart in the portable telephone in accordance with the embodiment of the present invention.

In the processing steps S207, S208 and S209 shown in FIG. 31, the processing steps S307, S308 and S309 in FIG. 34, the processing steps S407, S408 and S409 in FIG. 37, the processing steps S507, S508 and S509 in FIG. 40, the processing steps S607, S608 and S609 in FIG. 41, the processing steps S707, S708 and S709 in FIG. 42, the processing steps S807, S808 and S809 in FIG. 45, the processing steps S907, S908 and S909 in FIG. 48, and the processing steps S1007, S1008 and S1009 in FIG. 51 are respectively similar to the above-mentioned steps S107, S108 and S109 shown in FIG. 28. Therefore the description on these processing steps is omitted in the following.

[Example of Electronic Mail Function (at the Time of Reception)]

Hereafter, there will be described an example in which information related to the reception mail is displayed on the subordinate display unit, and when the display of the reception mail comes to a desired reception mail information, the detail information of the reception mail of interest is displayed on the main display unit.

The portable telephone is provided with an electronic mail transmission/reception function by a data communication means. Further, as mentioned above, the portable telephone retains the telephone directory data which includes personal name, telephone number, mail address. This telephone directory data is constituted of the information containing each corresponding directory item in each record. (An exemplary data structure of the telephone directory data is the same as that mentioned above.)

FIG. 34 shows a third processing flowchart in the portable telephone in accordance with the embodiment of the present invention. On detection of a button operation (depression) by the user (S300), the portable telephone accesses a mail server and identifies whether or not a new mail has arrived (S301). When there is no new arrival mail, subordinate display unit 23 is restored to the initial condition before the button operation (S309), and the processing is terminated. When there is a new arrival mail(s) preserved in the server, the number of the arrival mail(s) is obtained, and the mail(s) concerned is downloaded. Among the downloaded mails, a sender's name of one selected mail (which is referred to as an object mail) is displayed on subordinate display unit 23 (S302). (The sender's name is usually described in 'From . . . ' of the header information of the electronic mail, together with a mail address.) Here, initially, an arrival mail having an earliest reception date/time is determined as the object mail.

Figure 35:
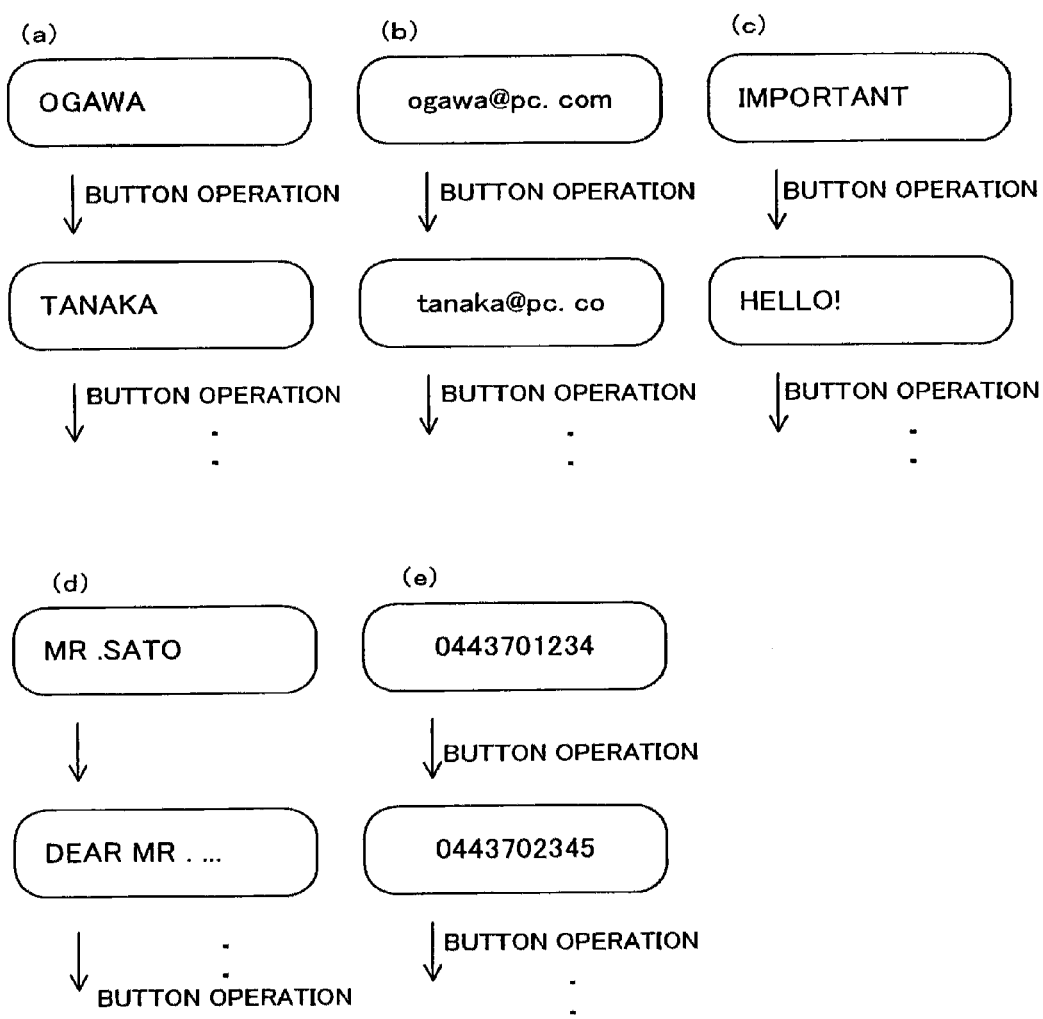
FIG. 35 shows display examples of a sender's name of an object mail on subordinate display unit 23.

FIG. 35 shows a display example of the object mail including the sender's name (a), etc. on subordinate display unit 23. It is also possible to display mail address (b), title (c), a part of the text (d), and the telephone number, with regard to the object mail. The sender's name, the title, the part of the text, the telephone number also consists the identification information corresponding to the mail address.

On detection of an open motion of the portable telephone (S304) within a predetermined time after the display of the sender's name (S303), a reception electronic mail display function is activated (S305), and the detailed information (text) of the object mail, the sender's name of which is displayed on subordinate display unit 23, is displayed on main display unit 21 (S306).

FIG. 36 shows a display example of the reception mail display screen on main display unit 21. In this FIG. 36, there is shown the display example when the open motion of the portable telephone is performed while any one of the following information is displayed on subordinate display unit 23: 'Ogawa' (FIG. 35(*a*)), 'ogawa@pc.com' (FIG. 35(*b*)), 'important' (FIG. 35(*c*)), 'To Mr. Sato' (FIG. 35(*d*)), or '0443701234' (FIG. 35(*e*)).

When a button operation is detected within a predetermined time after the aforementioned display of the sender's name, or the like, a new reception mail having the latest reception date/time but one is determined as an object mail, and the process returns to the aforementioned step S303. Here, when the current object mail is the reception mail having the latest reception date/time, the reception mail having the earliest reception date/time is determined as an object mail.

Meanwhile, when no operation by the user is detected within the predetermined time after the aforementioned display of the sender's name or the like, the process is terminated.

In the above-mentioned processing example, the sender's name described in the reception mail is displayed on subordinate display unit 23. However, it may also be possible to search the telephone directory data by use of the mail address in the reception mail, and display a personal name corresponding to the mail address. The mail address may be obtained from 'From . . . ' which is included in the header information of the reception mail.

Further, it is also possible to display the mail address of the reception mail, instead of the sender's name (FIG. 35(*b*)). This enables to cope with a case that the sender's name is not described in the 'From . . . ' of the reception mail.

Also, it is possible to display the title of the reception mail on the subordinate display unit (FIG. 35(*c*)). The title may be obtained from 'Subject', which is included in the header information of the reception mail. Or, it may also be possible to display the text of the reception mail on the subordinate display unit. The text can be obtained from the parts after the line having only a new line code following the header information of the reception mail. Further, it is also possible to search the telephone directory data by use of the mail address of the reception mail and display the telephone number corresponding to the mail address concerned (FIG. 35(*e*)). The method for obtaining the mail address is the same as the aforementioned method.

[Example of Telephone Function]

Hereafter, there will be described an example of displaying information related to the telephone on the subordinate display unit, and when desired information is displayed, either displaying the detailed information of the information of interest on the main display unit, or executing a function designated by the information of interest, by opening the portable telephone. The telephone directory data structure is the same as that described above.

A) An example of displaying a personal name in the telephone directory on the subordinate display unit, and originating a call initiated by making the portable telephone open when a desired name is displayed, using the telephone number corresponding to the desired name:

FIG. 37 shows a fourth processing flowchart in the portable telephone in accordance with the embodiment of the present invention. When the portable telephone detects a button operation (depression) by the user (S400), the portable telephone identifies whether or not the registration exists by accessing the telephone directory data (S401). When the number of registration items is nil, subordinate display unit 23 is restored to the initial condition before the button operation (S409), and the process is terminated. When the number of registration items is one or more, a personal name (identification information) in the object record of the telephone directory data is obtained, and the obtained name is displayed on subordinate display unit 23 (S402).

Figure 38:
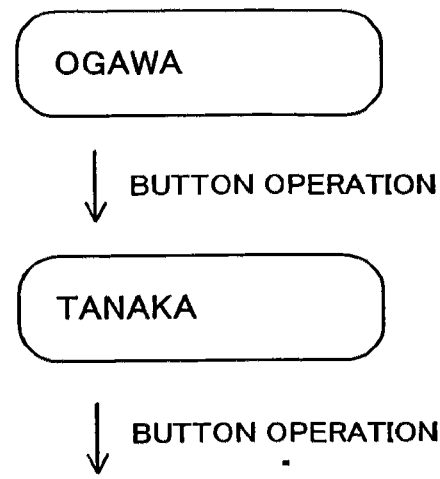
FIG. 38 shows a display example of an object record name on subordinate display unit 23.

FIG. 38 shows a display example of the personal or the object record, which is displayed on subordinate display unit 23. The display contents are changed in accordance with the change of the object record by a button operation.

Referring back to FIG. 37, on detection of the open motion of the portable telephone (S404) within a predetermined time after the display of the name (S403), a telephone number corresponding to the name on display is obtained from the telephone directory data, and a call is originated by use of the telephone number concerned (S405). At this time, preferably, the terminating telephone number and a current processing condition (call origination condition) is displayed on main display unit 21 (S406).

Figure 39:
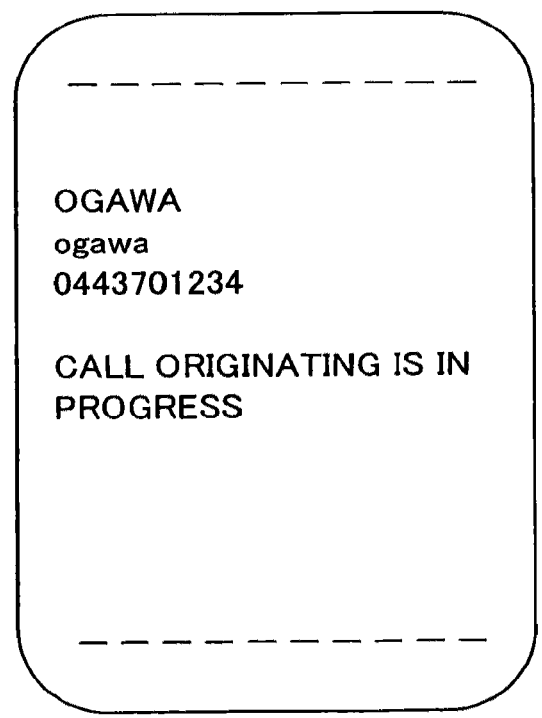
FIG. 39 shows a display example on main display unit 21.

FIG. 39 shows a display example displayed on main display unit 21. In this FIG. 39, there is shown a display example when the open motion of the portable telephone is performed while 'Ogawa' is displayed on subordinate display unit 23.

Meanwhile, on detection of the button operation within the predetermined time after the aforementioned display of the name (S407), the next record in the telephone directory data to the current object record is newly set as an object record (S408), and the process returns to the step S402. If the current object record is the final record, then the top record is set as the object record. Further, when no user operation has been detected within the predetermined time after the aforementioned display of the name, this process is terminated.

In the example described above, the name is displayed on subordinate display unit 23. However, it is also possible to read out the reading from the telephone directory data, and display the reading on subordinate display unit 23. Also, it is possible to read out other telephone directory data such as a telephone number and a mail address, and display the readout data on subordinate display unit 23. When the telephone number is read out from the telephone directory data and display the telephone number on subordinate display unit 23, it is not necessary, in the aforementioned processing of S405, to access the telephone directory data again to obtain the telephone number.

Further, in the above-mentioned processing example, when displaying on subordinate display unit 23, if other item data than the telephone number is to obtain, only the item data concerned is obtained. However, it is possible to obtain the telephone number corresponding to the item data of interest, and originate a call by use of the obtained telephone number when the portable telephone is opened.

B) An example of displaying information related to call origination history on the subordinate display unit, and originating a call initiated by making the portable telephone open when a desired opposite party is displayed, using the telephone number corresponding to the opposite party of interest:

The portable telephone is provided with a function of retaining call origination history with respect to originated calls. This call origination history is constituted of the number of history items and call origination histories in which each record contains one history data. This history information includes a telephone number, the corresponding personal name stored in the telephone directory data, and the corresponding originating date/time information of the call. Here, in case of call origination initiated by direct input of the telephone number by the user, instead of call origination by use of the telephone directory data, name information in the telephone directory data is not recorded as history information.

[An Exemplary Data Structure of the Call Origination History (in Case of 5 History Items)]

1 5 0443701234 Ogawa 200108101038 0443702345 Tanaka 200108110850 0443703456 200108111321:

FIG. 40 shows a fifth processing flowchart in the portable telephone in accordance with the embodiment of the present invention. When the portable telephone detects a button operation (depression) by the user (S500), the portable telephone identifies whether or not the call origination history exists by accessing the call origination history data (S501). When the number of history items is nil, subordinate display unit 23 is restored to the initial condition before the button operation (S509), and the process is terminated. When the number of history items is one or more, a personal name in the object record of the call origination history data is obtained, and the obtained name is displayed on subordinate display unit 23 (S502). A display example of the name in the object record is the same as the display example shown in FIG. 37. When there is no name recorded in the object record of the call origination history data, a corresponding telephone number is displayed. In addition, initially, the top record is used as the object record.

On detection of an open motion of the portable telephone (S504) within a predetermined time after the display of the name (S503), a telephone number corresponding to the name on display is obtained from the call origination history data, and a call is originated by use of the telephone number concerned (S505). When the telephone number, not the name, is displayed on subordinate display unit 23, the call is originated by use of the telephone number without accessing the call origination history data again. Also, preferably, the terminating telephone number and the current processing condition (condition of the originating call) is displayed on main display unit 21 (S506). A display example displayed on main display unit 21 is the same as that shown in FIG. 39.

In the example described above, the name is obtained from the call origination history data, so that the name is displayed on subordinate display unit 23. Instead, it is possible to obtain the telephone number, and display the obtained telephone number on subordinate display unit 23. In such a case, in the aforementioned processing step S505, it is not necessary to access the call origination history data again to obtain the telephone number.

Further, in the above-mentioned processing example, when displaying the name on subordinate display unit 23, only the name of interest is obtained from the history information. However, it is possible to obtain both the name and the telephone number corresponding to the name, and originate a call by use of the obtained telephone number when the portable telephone is opened.

Also, when the name is not recorded as the history information, it is possible to search the telephone directory data by use of the telephone number in the call origination history data, and obtain the corresponding name from the telephone directory data so that the name is displayed on subordinate display 23. Further, in case that the call is originated by use of a telephone number directly input from the user, it is possible to search the telephone directory data using this telephone number, and record the corresponding name to the call origination history data after the name is obtained from the telephone directory data.

C) An example of originating a call by use of a call termination history:

The portable telephone is provided with a function of retaining call termination history with respect to terminated calls. This call termination history is constituted of the number of history items and call termination histories in which each record contains one history data. This history information includes a telephone number which is informed when the call is terminated, the corresponding personal name stored in the telephone directory data, and the corresponding terminating date/time information of the call. Here, in case the telephone number informed at the termination of the call is not registered in the telephone directory data, name information in the telephone directory data is not recorded as history information.

[An Exemplary Data Structure of the Call Termination History (in Case of 5 History Items)]

2 5 0443701234 Ogawa 200108101038 0443702345 Tanaka 200108110850 0443703456 200108111321:

FIG. 41 shows a sixth processing flowchart in the portable telephone in accordance with the embodiment of the present invention. When the portable telephone detects a button operation (depression) by the user (S600), the portable telephone identifies whether or not the call termination history exists by accessing the call termination history data (S601). When the number of history items is nil, subordinate display unit 23 is restored to the initial condition before the button operation (S609), and the process is terminated. When the number of history items is one or more, a personal name in the object record of the call termination history data is obtained, and the obtained name is displayed on subordinate display unit 23 (S602). A display example of the name in the object record is the same as the display example shown in FIG. 37. When there is no name recorded in the object record of the call termination history data, a corresponding telephone number is displayed. In addition, initially, the top record is used as the object record.

On detection of an open motion of the portable telephone (S604) within a predetermined time after the display of the name (S603), a telephone number corresponding to the name on display is obtained from the call termination history data, and a call is originated by use of the telephone number concerned (S605). When the telephone number, not the name, is displayed on subordinate display unit 23, the call is originated by use of the telephone number without accessing the call termination history data again. Also, preferably, the terminating telephone number and the current processing condition (condition of the originating call) is displayed on main display unit 21 (S606). A display example displayed on main display unit 21 is the same as that shown in FIG. 39.

In the example described above, the name is obtained from the call termination history data, so that the name is displayed on subordinate display unit 23. Instead, it is possible to obtain the telephone number, and display the obtained telephone number on subordinate display unit 23. In such a case, in the aforementioned processing step S605, it is not necessary to access the call termination history data again to obtain the telephone number.

Further, in the above-mentioned processing example, when displaying the name on subordinate display unit 23, only the name of interest is obtained from the history information. However, it is possible to obtain both the name and the telephone number corresponding to the name, and originate a call by use of the obtained telephone number when the portable telephone is opened.

D) An example of displaying on the subordinate display unit the information related to a voice message recorded at the time of an incoming call in absence, and regenerating the voice message recorded by the opposite party by opening the portable telephone when the opposite party concerned is selected as a desired party:

The portable telephone has a function of recording a message from the calling party as a voice message when no response is given to the telephone call (no answer) within a predetermined number of ringing signals from the calling party (or a predetermined time). This function is the same as an automatic answering machine provided in an ordinary telephone.

This voice message data is constituted of the number of message items and message data of which each record has one message. This message data includes a telephone number informed at the time of receiving a call and a corresponding name in the telephone directory data, call reception date/time, and corresponding information of voice data of the message. Here, when the telephone number informed at the time of receiving the call has not been registered, the name information in the telephone directory data is not recorded as a message data. Such a name or receiving date/time is identification information of the voice data.

[A Configuration Example of the Voice Message (in Case of 5 Message Items)]

3 5 0443701234 Ogawa 200108101038 Hello! . . . 0443702345 Tanaka 200108110850 How have you been since I met you before? . . . 0443703456 200108111321 Hello! This is the first time I call you . . . .

FIG. 42 is a seventh processing flowchart of the portable telephone in accordance with the embodiment of the present invention. On detection of a user's button operation (depression) (S701), the portable telephone verifies whether or not there is any message by accessing the voice message data (S701). When the number of the message items is nil, the subordinate display unit 23 is restored to the initial condition before the button operation (S709), and the process is terminated. When the number of message items is one or more, the name in the object record in the voice message data is obtained, and this obtained name is displayed on subordinate display unit 23 (S702).

Figure 43:
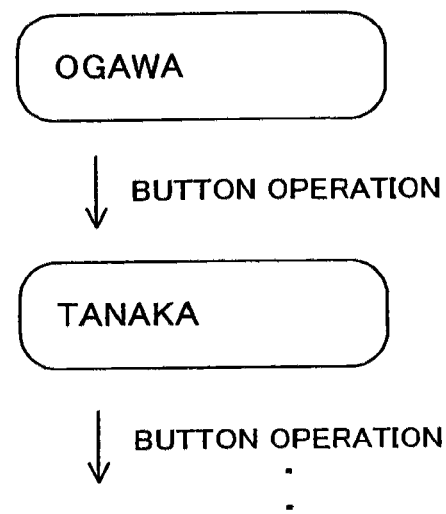
FIG. 43 shows a display example of ah object record name on subordinate display unit 23.

FIG. 43 shows a display example of the name in the object record, which is displayed on subordinate display unit 23. As the object record is changed by the button operation, the display contents are changed. When the name is not recorded in the object record of the voice message data, the corresponding telephone number is displayed. In addition, initially, the top record is used as the object record.

Referring back to FIG. 42, on detection of the open motion of the portable telephone (S704) within a predetermined time after the display of the name (S703), the voice data corresponding to the displayed name is obtained from the voice message data, and the voice data concerned is regenerated (S705). At this time, preferably, the name corresponding to the regenerated voice data and the current processing condition (in regeneration) is displayed on main display unit 21 (S706).

Figure 44:
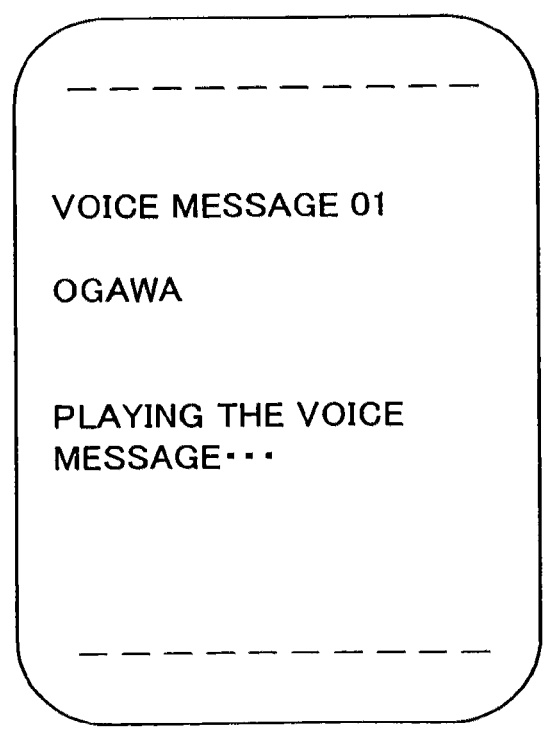
FIG. 44 shows a display example on main display unit 21.

FIG. 44 shows a display example of main display unit 21. In FIG. 44, there is shown a display example when the open motion of the portable telephone is performed while 'Ogawa' is displayed on subordinate display unit 23.

In the above-mentioned processing example, the name is obtained from the voice message data so that the name is displayed on subordinate display unit 23. Instead, it is also possible to obtain the telephone number and display on subordinate display unit 23.

Also, in the above-mentioned processing example, when displaying the name on subordinate display unit 23, only the name is obtained from the message data. However, it is possible to obtain corresponding voice data together with the name, and regenerate the voice data when the portable telephone is opened.

Further, when the voice data is regenerated, it is also possible not to display any information on main display unit 21 in this processing, instead of displaying information as described above.

E) An example of displaying a part of information (for example, a name) of the telephone directory data on the subordinate display unit, and when desired information is displayed, displaying the telephone directory data corresponding to the desired information on the main display by opening the portable telephone:

The telephone directory data has the same data structure as mentioned earlier.

FIG. 45 is a eighth processing flowchart of the portable telephone in accordance with the embodiment of the present invention. On detection of the button operation (depression) by the user (S800), the portable telephone accesses the telephone directory data and verifies whether or not there has been any registration (S801). When the number of registration is nil, subordinate display unit 23 is restored to the initial condition before the button operation (S809), and the process is terminated. When the number of registration items is one or more, a name (identification information) in the object record of the telephone directory data is obtained, and the obtained name is displayed on subordinate display unit 23 (S802).

Figure 46:
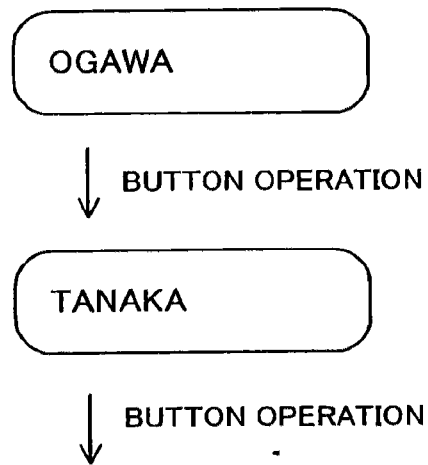
FIG. 46 shows a display example of an object record name on subordinate display unit 23.

FIG. 46 shows a display example of the name in the object record, which is displayed on subordinate display unit 23. The display contents are changed in accordance with the change of the object record initiated by the button operation. In addition, initially, the top record is used as the object record.

Referring back to FIG. 45, on detection of the open motion of the portable telephone (S804) within a predetermined time after the name is displayed (S803), the telephone directory data display function is initiated, and the telephone directory data corresponding to the name is obtained. The obtained telephone directory data is then displayed on main display unit 21 (S805).

Figure 47:
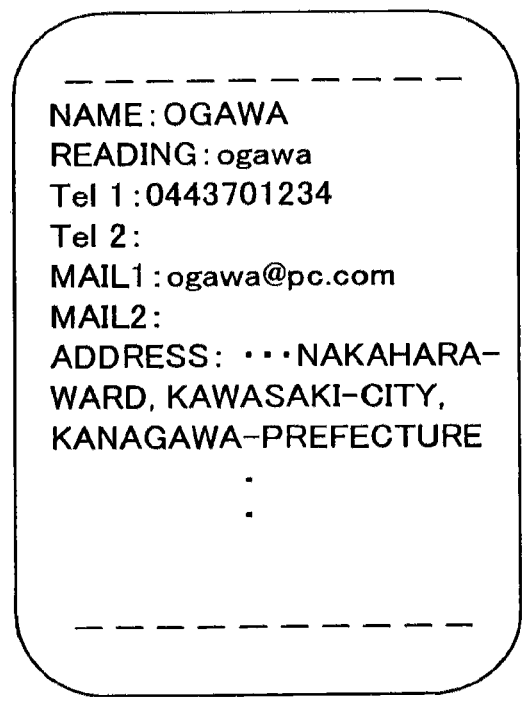
FIG. 47 shows a display example on main display unit 21.

FIG. 47 is a display example displayed on main display unit 21. In FIG. 47, there is shown a display example when the portable telephone is opened while 'Ogawa' is displayed on subordinate display unit 23.

In the above-mentioned processing example, the name is displayed on the subordinate display unit. However, it is also possible to read out reading information from the telephone directory data and display this information on the subordinate display unit. Further, it is also possible to read out other telephone directory data such as a telephone number and a mail address, and display such readout information on the subordinate display unit.

Also, in the above-mentioned processing example, only one item data in one record of the telephone directory data is obtained when displaying on the subordinate display unit. However, it is also possible to obtain the entire item data in one record and display the entire item data when the portable telephone is opened.

F) An example of displaying menu items in an incorporated menu on the subordinate display unit, and when a desired item is displayed, a function of the menu item concerned is executed by opening the portable telephone:

The portable telephone is capable of executing a plurality of functions, and provides an incorporated menu consisting of menu items each corresponding to each function, so as to initiate each function. This incorporated menu data has records each corresponding to one function, constituted of a menu item name and information corresponding to a program to be-activated.

[An Exemplary Data Structure of the Menu Data]
Clock setting Program 1
Setting for call reception Program 2
:

FIG. 48 shows a ninth processing flowchart of the portable telephone in accordance with the embodiment of the present invention. On detection of the button operation (depression) by the user (S900), the portable telephone accesses the menu data and obtains a menu item name (identification information) of the object record, and displays the obtained menu item name to subordinate display unit 23 (S902).

Figure 49:
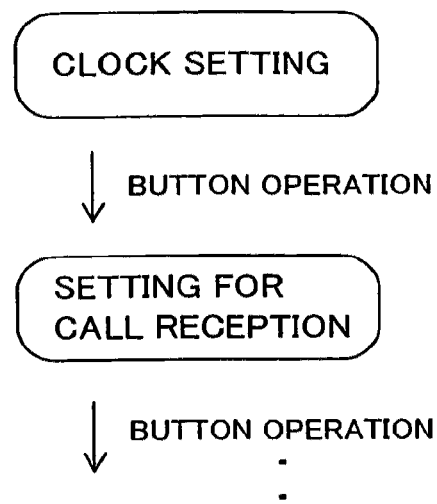
FIG. 49 shows a display example of menu item name of an object record, which is displayed on subordinate display unit 23.

FIG. 49 shows a display example of the menu item name of the object record, which is displayed on subordinate display unit 23. When the object record is changed by the button operation, the display contents are changed. In addition, initially, the top record is used as the object record.

Referring back to FIG. 48, on detection of the open motion of the portable telephone (S904) within a predetermined time after the menu item name is displayed (S903), a program corresponding to the menu item name displayed on subordinate display unit 23 is activated (S905). When the activated program includes processing which displays predetermined information, the predetermined information of interest is displayed on main display unit 21 (S906). When the open motion is not detected within the predetermined time, subordinate display unit 23 is restored to the initial condition before the button operation (S909), and the processing is terminated.

Figure 50:
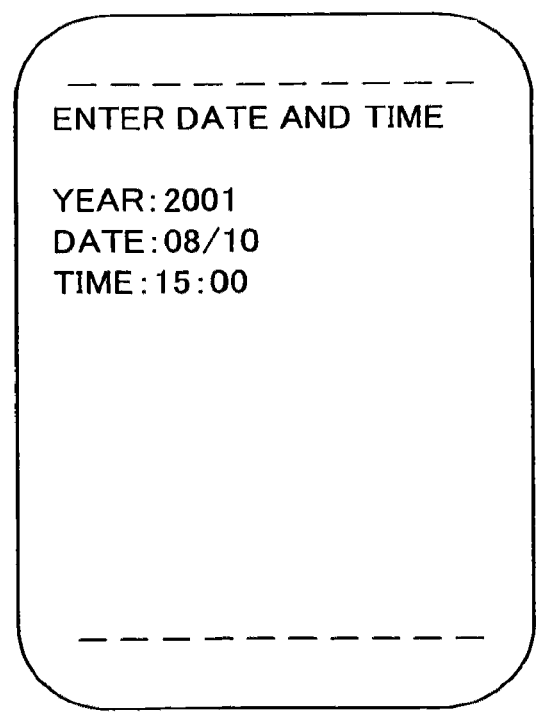
FIG. 50 shows a display example on main display unit 21.

FIG. 50 shows a display example which is displayed on main display unit 21. FIG. 50 shows a display example when the portable telephone is opened while 'Clock setting' is displayed on subordinate display unit 23.

G) An example of displaying information representing a retained application program on the subordinate display unit, and the application program displayed by the information concerned is activated by opening the portable telephone when desired information is displayed:

The portable telephone is provided with a function of downloading an application program which is executable in the portable telephone from a Web page by means of data communication, and reserving the downloaded application program, and activating and executing the downloaded application program. This application program is not only downloaded from a Web page, but may also be received through an electronic mail, or reserved in advance in the portable telephone.

A management data of this application program is constituted of the number of application program items, a name (identification information) of each application program, and corresponding information of reservation location information (address) of the program concerned.

One item constitutes one record.

[An Exemplary Data Structure of the Application Program Management Data (5 Reserved Items)]

4 5 calendar address1 schedule address2:

FIG. 51 shows a tenth processing flowchart of the portable telephone in accordance with the embodiment of the present invention. On detection of the button operation (depression) by the user, the portable telephone accesses the management data of the application program, and verifies whether or not any application program is reserved (S1001). When the number of registration items is nil, subordinate display unit 23 is restored to the initial condition before the button operation (S1009), and the process is terminated. When the number of reservation items is one or more, an application program name in the object record of the management data is obtained, and the obtained name is displayed on subordinate display unit 23 (S1002).

Figure 52:
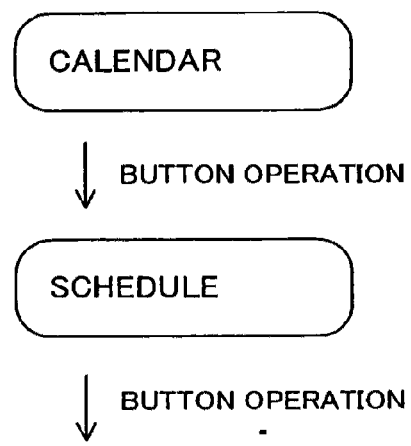
FIG. 52 shows a display example of an object record name on subordinate display unit 23.

FIG. 52 shows a display example of the name of the object record, which is displayed on subordinate display unit 23. When the object record is changed by the button operation, the display contents are also changed. In addition, initially, the top record is used as the object record.

Referring back to FIG. 51, on detection of the open motion of the portable telephone (S1004) within a predetermined time after the display of the application program name (S1003), the reservation location information (address) corresponding to the application program name is obtained from the management data, and the application program is activated (S1005). At this time, preferably, the application program name to be activated and a current processing condition (in activation) is displayed on main display unit 21 (S1006).

In the above-mentioned example, the application program name and the corresponding reservation location information are obtained at different timing. However, it is also possible to obtain the application program name and the reservation location information at the same timing, and activate the application program on detection of the open motion of the portable telephone by use of the reservation location information having been obtained.

Figure 53:
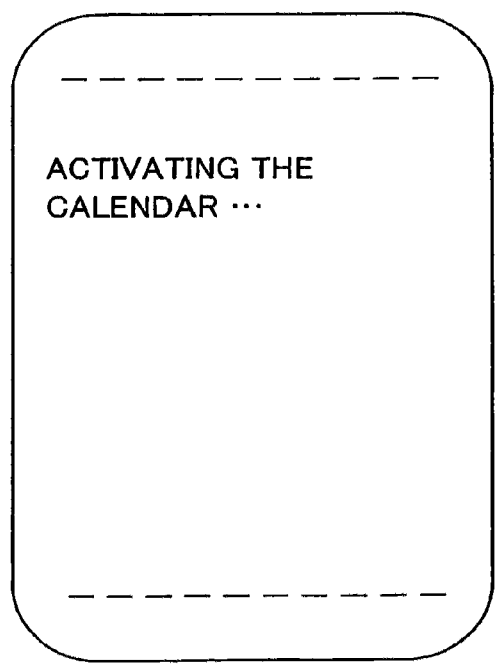
FIG. 53 shows a display example on main display unit 21.

FIG. 53 shows a display example displayed on main display unit 21. More specifically, FIG. 53 shows a display example when the portable telephone is opened while the application program name 'Calendar' is displayed on subordinate display unit 23.

In each embodiment of the present invention described above, in which the portable telephone is taken as an example, when the display information to be displayed on subordinate display unit 23 is too long to display at a time, it may be possible to display the information with scrolling by shifting the display information for a predetermined number of dots at predetermined intervals.

Also, in the above description of the embodiments of the present invention taking the portable telephone as an example, there is provided a single operation button for operating subordinate display unit 23, so that each function is performed individually. However, it is also possible to enable the user to select a desired function, so as to start the aforementioned processing with regard to the selected function.

For example, on detection of the button operation (depression) by the user, when the button operation time (depression time) continues for a predetermined time (in short, the user is depressing the operation button for a long time), the condition is shifted to a function selection condition, and the function name is displayed on the subordinate display unit. And on detection of the button operation (depression) within a predetermined time after the aforementioned display of the function name, the next function name is selected as a display object and displayed on subordinate display unit 23. Here, initially, the display object is the first function name.

Otherwise, when the button operation (depression) is not detected within the predetermined time after the aforementioned display of the function name, the function name currently displayed is regarded as a selected function name, and the execution of the corresponding function is started. Namely, the processing of the selected function illustrated in the aforementioned embodiments of the present invention is executed.

In such a configuration, the first button operation (depression) by the user, which is illustrated in the embodiment of each function, becomes unnecessary. Also, it may be possible to shift to the function selection condition when a simple button operation (depression) is detected, instead of the operation button depressed for a long time as mentioned above.

Further, in the case of the portable telephone having two operation buttons, any one of the operation buttons may be assigned as a button for the function selection. In such a case, if the operation of the above-mentioned button is not performed within a predetermined time after the button is operated (depressed), the function corresponding to the function name which is displayed at that time may be regarded as being selected by the user.

Instead, it may also be possible to regard that the user has selected the function corresponding to the function name displayed at that time when the operation of another button is detected.

Industrial Applicability

As the present invention has been described, in the terminal (device) according to the present invention, predetermined processing (for example, access processing to a URL registered in advance on a network) is automatically executed in response to the cancellation operation of the power saving mode. This enables to execute predetermined processing (for example, accessing the predetermined URL on the network) only by the cancellation operation of the power saving mode without need of an extra operation for the processing. Thus, operability of the terminal is improved, and as a result, convenience for the user is improved.

Also, in a terminal (device) having a folding mechanism, predetermined processing is automatically executed in response to the open motion from the closed condition. This enables to execute the predetermined processing only by the open motion without need of an extra operation for the processing. Thus operability of the terminal is improved, and as a result, convenience for the user is improved.

The foregoing description of the embodiments is not intended to limit the invention to the particular embodiments illustrated. The scope of the present invention runs to the inventions described in the appended claims and the equivalents thereof.

What is claimed is:

1. A device having a normal working state and a standby state, comprising:
 a second display section that displays information in the standby state;
 an operation section that instructs information, which is selected by a user from among a plurality of information based on an operation of the user in the standby state, to display on the second display section;

a processing section that performs a process corresponding to the selected information being displayed on the second display section at the time of shifting from the standby state to the normal working state; and a first display section that displays information, the information displayed on the first display section being in a visible condition during the normal working state and being in an invisible condition during the standby state; wherein the information displayed on the second display section is in the visible condition even when the first display section is in the invisible condition, and the processing section instructs information to display on the first display section based on the process corresponding to the selected information.

2. The device according to claim 1, wherein:
the normal working state is a normal working mode in which the first display section is in a display condition, and the standby state is a power saving mode in which the first display section is in a non-display condition and the device works with less power consumption than in the normal working mode.

3. The device according to claim 1, wherein:
the information displayed on the second display section is information related to URL of a Web page,
the operating section enables the user to select information related to a desired URL from among information related to URLs, and
at the time of shifting from the standby state to the normal working state, the processing section instructs to display on the first display section a Web page corresponding to the information related to the URL selected and displayed on the second display section by the user.

4. The device according to claim 3, further comprising:
a registration section in which the information related to the URL displayed on the second display section can be registered by the user.

5. The device according to claim 3, wherein the information related to the URL displayed on the second display section is information related to a URL of a Web page the update of which is detected.

6. The device according to claim 5, wherein:
the URL is a URL of the Web page the update of which is detected by patrolling the registered URL and determining an updated condition of each URL.

7. The device according to claim 1, wherein:
the information displayed on the second display section is information related to voice data,
the operating section enables the user to select information related to desired voice data from among information related to a plurality of voice data, and
at the time of shifting from the standby state to the normal working state, based on the information selected and displayed on the second display section by the user, the processing section performs playback of the voice data corresponding to the information.

8. The device according to claim 1, wherein:
the information displayed on the second display section is information related to an electronic mail,
the operating section enables the user to select information related to a desired electronic mail from among information related to a plurality of electronic mail, and
at the time of shifting from the standby state to the normal working state, based on the information selected and displayed on the second display section by the user, the processing section performs a process related to the electronic mail corresponding to the information.

9. The device according to claim 8, wherein:
the information related to the electronic mail is information related to an electronic mail address, and
at the time of shifting from the standby state to the normal working state, the processing section instructs to display on the first display section a screen for creating an electronic mail addressed to the electronic mail address corresponding to the information selected and displayed on the second display section by the user.

10. The device according to claim 8, wherein:
the information related to the electronic mail is information related to a received electronic mail, and
at the time of shifting from the standby state to the normal working state, the processing section instructs to display on the first display section the received mail information corresponding to the information selected and displayed on the second display section by the user, the received mail information on the first display section including at least information different from the information displayed on the second display section.

11. The device according to claim 1, wherein:
the information displayed on the second display section is information related to a telephone number,
the operating section enables the user to select information related to a desired telephone number from among information related to a plurality of telephone numbers, and
at the time of shifting from the standby state to the normal working state, based on the information selected and displayed on the second display section, the processing section performs a process related to the corresponding telephone number.

12. The device according to claim 11, further comprising:
a telephone directory data in which the user can register a telephone number,
wherein the information related to the telephone number is information registered in the telephone directory data, and
the processing section originates a call by use of the telephone number corresponding to the information selected and displayed on the second display section by the user.

13. The device according to claim 11, further comprising:
history information related to the telephone number including at least a call origination history or a call termination history,
wherein the information related to the telephone number is information registered in the history information, and
the processing section originates a call by use of the telephone number corresponding to the information selected and displayed on the second display section by the user.

14. The device according to claim 11, wherein:
the information related to the telephone number is information of an originating party corresponding to a recorded voice data, and
the processing section plays back the voice data corresponding to the information selected and displayed on the second display section by the user.

15. The device according to claim 11, further comprising:
a telephone directory data in which the user can register a telephone number,
wherein the information related to the telephone number registered in the telephone directory data is displayed on the second display section, and
at the time of shifting from the standby state to the normal working state, the processing section instructs to display on the first display section the telephone directory data contents corresponding to the information selected and displayed on the second display section by the user, the telephone directory data displayed on the first display section including at least information different from the information displayed on the second display section.

16. The device according to claim 1, wherein:
the information displayed on the second display section is information related to an executable program, and
at the time of shifting from the standby state to the normal working state, based on the information selected and displayed on the second display section by the user, the processing section executes the program corresponding to the information.

17. The device according to claim 1, further comprising:
a folding mechanism by which the device can be opened and closed,
wherein the first display section is disposed in a position in which the display contents of the first display section are visible when the folding mechanism is in an open condition, and the display contents of the first display section are invisible when the folding mechanism is in a closed condition, and
the second display section is disposed in a position in which the display contents of the second display section are visible even when the folding mechanism is in the closed condition.

18. A non-transitory computer readable storage medium for controlling a computer, comprising a program to be executed by the computer having a normal working state and a standby state and including a first display section and a second display section, wherein information displayed on the first display section is in a visible condition in the normal working state and in an invisible condition in the standby state, and information displayed on the second display section is in the visible condition even when the first display section is in the invisible condition, said program causing the computer to execute:
instructing information, selected by the user from among a plurality of information based on an operation of the use in the standby state, to display on the second display section;
displaying the information, selected by a user from among a plurality of information based on an operation of the user in the standby state, on the second display section on the computer in the standby state;
performing a process corresponding to the selected information being displayed on the second display section at the time of shifting from the standby state to the normal working state; and
instructing information to display on the first display section based on the process corresponding to the selected information.

19. The non-transitory computer readable storage medium according to claim 18, wherein:
the normal working state is a normal working mode in which the first display section is in a display condition, and the standby state is a power saving mode in which the first display section is in a non-display condition and the computer works with less power consumption than in the normal working mode.

20. The non-transitory computer readable storage medium according to claim 18, said program causing said computer to further execute:
displaying information related to a URL of a Web page on the second display section; and
at the time of shifting from the standby state to the normal working state, instructing to display on the first display section a Web page corresponding to the information related to the URL selected and displayed on the second display section by the user.

21. The non-transitory computer readable storage medium according to claim 20, wherein the URL displayed on the second display section is arbitrarily registered by a user.

22. The non-transitory computer readable storage medium according to claim 20, wherein:
the information related to the URL displayed on the second display section is information related to a URL of a Web page the update of which is detected.

23. The non-transitory computer readable storage medium according to claim 20, said program causing said computer to further execute:
determining an updated condition of each URL by patrolling the registered URL; and
displaying on the second display section the URL of the Web page the update of which is detected.

24. The non-transitory computer readable storage medium according to claim 18, said program causing said computer to further execute:
displaying information related to voice data on the second display section;
enabling the user to select information related to a voice data desired by the user from among information related to a plurality of voice data; and
at the time of shifting from the standby state to the normal working state, based on the information selected and displayed on the second display section by the user, performing playback of the voice data corresponding to the information.

25. The non-transitory computer readable storage medium according to claim 18, said program causing said computer to further execute:
displaying information related to an electronic mail on the second display section;
enabling the user to select information related to a electronic mail desired by the user from among information related to a plurality of electronic mail; and
at the time of shifting from the standby state to the normal working state, based on the information selected and displayed on the second display section by the user, performing a process related to the electronic mail corresponding to the information.

26. The non-transitory computer readable storage medium according to claim 25, said program causing said computer to further execute:
displaying information related to an electronic mail address on the second display section; and
instructing to display on the first display section a screen for creating an electronic mail addressed to the electronic mail address corresponding to the information selected and displayed on the second display section by the user.

27. The non-transitory computer readable storage medium according to claim 25, said program causing said computer to further execute:
displaying information related to a received electronic mail on the second display section; and
instructing to display on the first display section the received mail information corresponding to the information selected and displayed on the second display section by the user, the received mail information on the first display section including at least information different from the information displayed on the second display section.

28. The non-transitory computer readable storage medium according to claim 18, said program causing said computer to further execute:
displaying information related to a telephone number on the second display section;
enabling the user to select information related to a telephone number desired by the user from among information related to a plurality of telephone numbers, and
at the time of shifting from the standby state to the normal working state, based on the information selected and displayed on the second display section, performing a process related to the telephone number corresponding to the information.

29. The non-transitory computer readable storage medium according to claim 28, wherein the computer includes a telephone directory data in which a user can register a telephone number, and said program causing said computer to further execute:
displaying information related to the telephone number registered in the telephone directory data on the second display section, the information related to the telephone number being information registered in the telephone directory data; and
at the time of shifting from the standby state to the normal working state, based on the information related to the telephone number displayed on the second display section, originating a call by use of the telephone number corresponding to said information corresponding to the information selected and displayed on the second display section by the user.

30. The non-transitory computer readable storage medium according to claim 28, said program causing said computer to further execute:
storing history information related to a telephone number constituted of a call origination history and/or a call termination history;
displaying information related to the telephone number registered in the history information is on the second display section; and
at the time of shifting from the standby state to the normal working state, based on the information related to the telephone number displayed on the second display section, originating a call by use of the telephone number corresponding to the information selected and displayed on the second display section by the user.

31. The non-transitory computer readable storage medium according to claim 28, said program causing said computer to further execute:
displaying, on the second display section, information related to the telephone number of an originating party corresponding to a recorded voice data; and
at the time of shifting from the standby state to the normal working state, based on the information related to the telephone number displayed on the second display section, playing back the voice data corresponding to the information selected and displayed on the second display section by the user.

32. The non-transitory computer readable storage medium according to claim 28, wherein:
the computer includes a telephone directory data in which a user can register a telephone number, and said program causes said computer to further execute:
displaying information related to the telephone number registered in the telephone directory data on the second display section; and
at the time of shifting from the standby state to the normal working state, instructing to display on the first display section the telephone directory data contents corresponding to the information selected and displayed on the second display section by the user, the telephone directory data contents on the first display section including at least information different from the information displayed on the second display section.

33. The non-transitory computer readable storage medium according to claim 18, said program causing said computer to further execute:
displaying information related to an executable program on the second display section; and
at the time of shifting from the standby state to the normal working state, based on the information displayed on the second display section, executing the program corresponding to the information.

34. The non-transitory computer readable storage medium according to claim 18, wherein:
the computer includes a folding mechanism by which the computer can be opened and closed,
the first display section is disposed in a position in which the display contents of the first display section are visible when the folding mechanism is in an open condition, and the display contents of the first display section are invisible when the folding mechanism is in a closed condition, and
the second display section is disposed in a position in which the display contents of the second display section are visible even when the folding mechanism is in the closed condition.

35. A device having a standby state and a normal state, comprising:
a display to display information during the standby state;
a button to instruct information selected by user from among a plurality of information based on an operation of the user operation in the standby state to display on the display; and
a processor to execute a process corresponding to the information selected and displayed at the time of shifting from the standby state to the normal state.

36. The device according to claim 35, wherein the shifting from the standby state comprises canceling the standby state.

37. The device according to claim 35, wherein the shifting from the standby state comprises shifting to a normal working state.

38. The device according to claim 35, wherein the standby state is a power saving mode.

* * * * *

UNITED STATES PATENT AND TRADEMARK OFFICE
CERTIFICATE OF CORRECTION

PATENT NO. : 8,261,111 B2
APPLICATION NO. : 12/149955
DATED : September 4, 2012
INVENTOR(S) : Nobutaka Ishidera et al.

It is certified that error appears in the above-identified patent and that said Letters Patent is hereby corrected as shown below:

On the Title Page, Item (63):

(63) Related U.S. Application Data

"7,424,631." should be "7,424,631 which is a continuation of application No. PCT/JP02/01056 filed on Feb. 7, 2002, which is a continuation of application No. PCT/JP01/00994 PCT/JP01/00994 filed on Feb. 13, 2001."

Signed and Sealed this
Twenty-eighth Day of May, 2013

Teresa Stanek Rea
*Acting Director of the United States Patent and Trademark Office*